US011838979B2

(12) United States Patent
Martinez Tarradell et al.

(10) Patent No.: US 11,838,979 B2
(45) Date of Patent: *Dec. 5, 2023

(54) APPARATUS OF GNB TO ENABLE AN INACTIVE MODE IN DUAL CONNECTIVITY

(71) Applicant: Apple Inc., Cupertino, CA (US)

(72) Inventors: Marta Martinez Tarradell, Munich (DE); Youn Hyoung Heo, Seoul (KR); Sudeep Palat, Cheltenham (GB); Seau S. Lim, Swindon (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,165

(22) Filed: Sep. 30, 2021

(65) Prior Publication Data
US 2022/0117027 A1 Apr. 14, 2022

Related U.S. Application Data

(63) Continuation of application No. 16/475,056, filed as application No. PCT/US2018/037551 on Jun. 14, 2018, now Pat. No. 11,140,740.
(Continued)

(51) Int. Cl.
H04W 4/00 (2018.01)
H04W 76/27 (2018.01)
(Continued)

(52) U.S. Cl.
CPC ........... *H04W 76/27* (2018.02); *H04W 24/10* (2013.01); *H04W 68/02* (2013.01); *H04W 76/15* (2018.02); *H04W 76/34* (2018.02)

(58) Field of Classification Search
CPC ..... H04W 24/10; H04W 68/02; H04W 76/15; H04W 76/27; H04W 76/34
See application file for complete search history.

(56) References Cited

U.S. PATENT DOCUMENTS

2015/0045052 A1  2/2015  Pao et al.
2015/0133122 A1  5/2015  Chen
(Continued)

FOREIGN PATENT DOCUMENTS

CN  105637967  6/2016
CN  106576366  4/2017
(Continued)

OTHER PUBLICATIONS

"3rd Generation Partnership Project; Technical Specification Group Radio Access Network; Evolved Universal Terrestrial Radio Access Network (E-UTRAN); X2 Application Protocol (X2AP)", Release 13, 3GPP, TS 36.423, vol. RAN WG3, No. V13.6.0, Jan. 11, 2017, pp. 1-239.
(Continued)

Primary Examiner — Phuc H Tran
(74) Attorney, Agent, or Firm — Kowert, Hood, Munyon, Rankin & Goetzel, P.C.

(57) ABSTRACT

Embodiments of a next generation Node-B (gNB), User Equipment (UE) and methods for communication are generally described herein. A gNB may be configurable to operate as a master gNB (MgNB). The MgNB may transmit radio-resource control (RRC) signaling to provide information for dual connectivity to allow the UE to utilize radio resources of both a master cell group (MCG) associated with the MgNB and a secondary cell group (SCG) associated with a secondary gNB (SgNB). The MgNB may transmit, to the SgNB, an SgNB release request message that indicates a partial suspension of the dual connectivity, wherein: a first portion of a configuration for the SCG is to be maintained and a second portion of the configuration for the SCG is to be released.

20 Claims, 12 Drawing Sheets

Related U.S. Application Data

(60) Provisional application No. 62/521,186, filed on Jun. 16, 2017.

(51) Int. Cl.
*H04W 76/34* (2018.01)
*H04W 76/15* (2018.01)
*H04W 24/10* (2009.01)
*H04W 68/02* (2009.01)

(56) References Cited

U.S. PATENT DOCUMENTS

| | | | |
|---|---|---|---|
| 2015/0223282 A1 | 8/2015 | Vajapeyam | |
| 2015/0270917 A1 | 9/2015 | Roman | |
| 2016/0044743 A1* | 2/2016 | Xu | H04W 76/34 370/329 |
| 2016/0192433 A1* | 6/2016 | Deenoo | H04W 24/08 370/329 |
| 2017/0019945 A1 | 1/2017 | Chiba | |
| 2017/0064769 A1 | 3/2017 | Zhang | |
| 2020/0163143 A1* | 5/2020 | Davydov | H04L 1/0029 |

FOREIGN PATENT DOCUMENTS

| | | |
|---|---|---|
| EP | 2983445 A1 | 2/2016 |
| WO | 2015047051 | 4/2015 |
| WO | 2015/165120 A1 | 11/2015 |
| WO | 2015178835 | 11/2015 |
| WO | 2015/197904 A1 | 12/2015 |
| WO | 2016/021821 A1 | 2/2016 |
| WO | 2016105570 | 6/2016 |
| WO | 2016119210 | 8/2016 |
| WO | 2016138937 | 9/2016 |

OTHER PUBLICATIONS

"3rd Generation Partnership Project; Technical Specification Group Radio Access Network; Study on New Radio Access Technology", Release 14, 3GPP, TR 38.912_RAN2+RAN3, V0.0.2, Sep. 2016, 32 pgs.

European Search Report for Application No. EP18816693.8, dated Dec. 15, 2020, 12 pgs.

"3GPP; TSGRAN; E-UTRAN; X2 application protocol (X2AP) (Release 14)", 3GPP TS 36.423 V14.2.0, (Mar. 27, 2017).

"International Application Serial No. PCT/US2018/037551, International Search Report dated Oct. 4, 2018", 3 pgs.

"International Application Serial No. PCT/US2018/037551, Written Opinion dated Oct. 4, 2018", 12 pgs.

Alcatel, Lucent, et al., "Handling of User Inactivity in the SeNB", R3-152397, 3GPP TSG-RAN3 Meeting #90, Anaheim, USA, (Nov. 7, 2015).

3rd Generation Partnership Project; Technical Specification Group Radio Access Network; Evolved Universal Terrestrial Radio Access Network (E-UTRAN); X2 application protocol (X2AP) (Release 13); Jan. 2017.

3rd Generation Partnership Project; Technical Specification Group Radio Access Network; Study on New Radio Access Technology (Release 14); Sep. 2016.

Ericsson "Introduction of option 3—Dual Connectivity with NR in E-UTRAN—RAN3 parts"; 3GPP TSG-RAN WG3 Meeting #95bis; Spokane, WA, USA; Apr. 3, 2017.

Office Action for CN Application No. 201880050687.6; dated Nov. 25, 2022.

Office Action for CN Application No. 201880050687.6; dated Jul. 20, 2023.

NEC "Reconsideration of User Inactivity in SCG bearer option"; 3GPP TSG-RAN WG3#90 R3-152597; Nov. 16, 2015.

NEC "User Inactivity in SCG bearer option"; 3GPP TSG-RAN WG3 #89bis R3-152072; Oct. 5, 2015.

Ericsson "CA establishment from idle and suspended"; 3GPP TSG-RAN WG2 #99bis R2-1711534; Oct. 9, 2017.

Broadcom Corporation "MCG handover for Dual Connectivity"; 3GPP TSG-RAN WG2 Meeting #85 R2-140531; Feb. 10, 2014.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); 3GPP TS 36.300 V. 14.1.0; Dec. 2016.

Notice of Grant for CN Patent Application No. 201880050687.6; dated Oct. 15, 2023.

Intel Corp. "SCG Release Handling"; 3GPP TSG-RAN WG2#86 R2-142029; May 19, 2014.

\* cited by examiner

APPARATUS OF GNB TO ENABLE AN INACTIVE MODE IN DUAL CONNECTIVITY

PRIORITY CLAIM

This application is a continuation of U.S. application Ser. No. 16/475,056, filed Jun. 28, 2019, which is a U.S. National Stage Filing under 35 U.S.C. 371 from International Application No. PCT/US2018/037551, filed Jun. 14, 2018 and published in English as WO 2018/232124 on Dec. 20, 2018, which claims priority to U.S. Provisional Patent Application Ser. No. 62/521,186, filed Jun. 16, 2017, each of which is incorporated herein by reference in its entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to usage of an inactive mode. Some embodiments relate to suspension and/or resumption of bearers. Some embodiments relate to dual connectivity (DC) arrangements.

BACKGROUND

Base stations and mobile devices operating in a cellular network may exchange data. Various techniques may be used to improve capacity, battery life and/or performance, in some cases. In an example, a mobile device may communicate with two base stations in a dual connectivity (DC) arrangement. In this scenario, a performance benefit may be realized. However, some operations may become challenging, such as exchanging of control signaling between the mobile device and the base stations and/or exchanging of control signaling between the base stations. Accordingly, there is a general need for methods and systems to perform operations related to dual connectivity in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
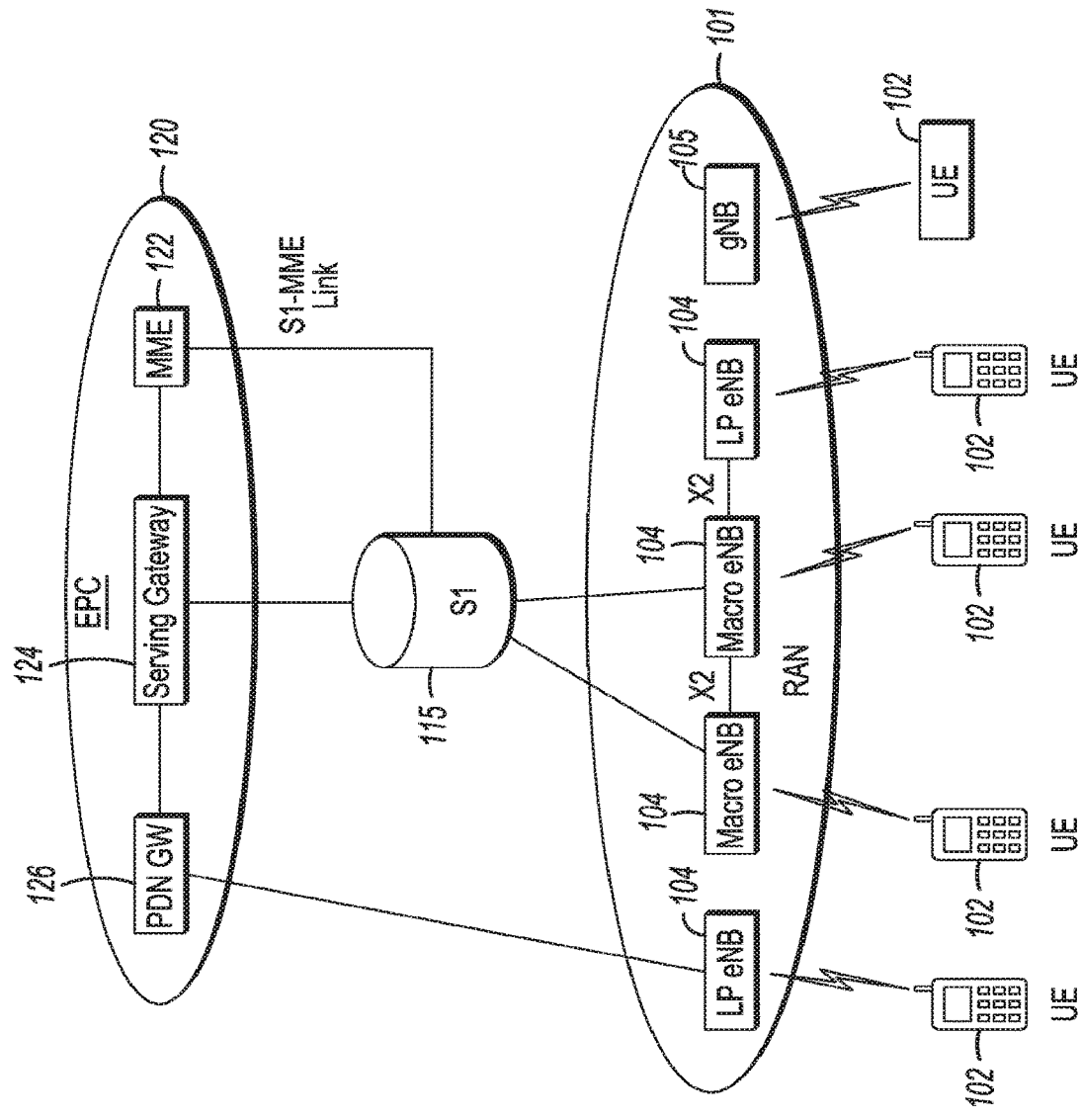
FIG. 1A is a functional diagram of an example network in accordance with some embodiments.
Figure 1B:
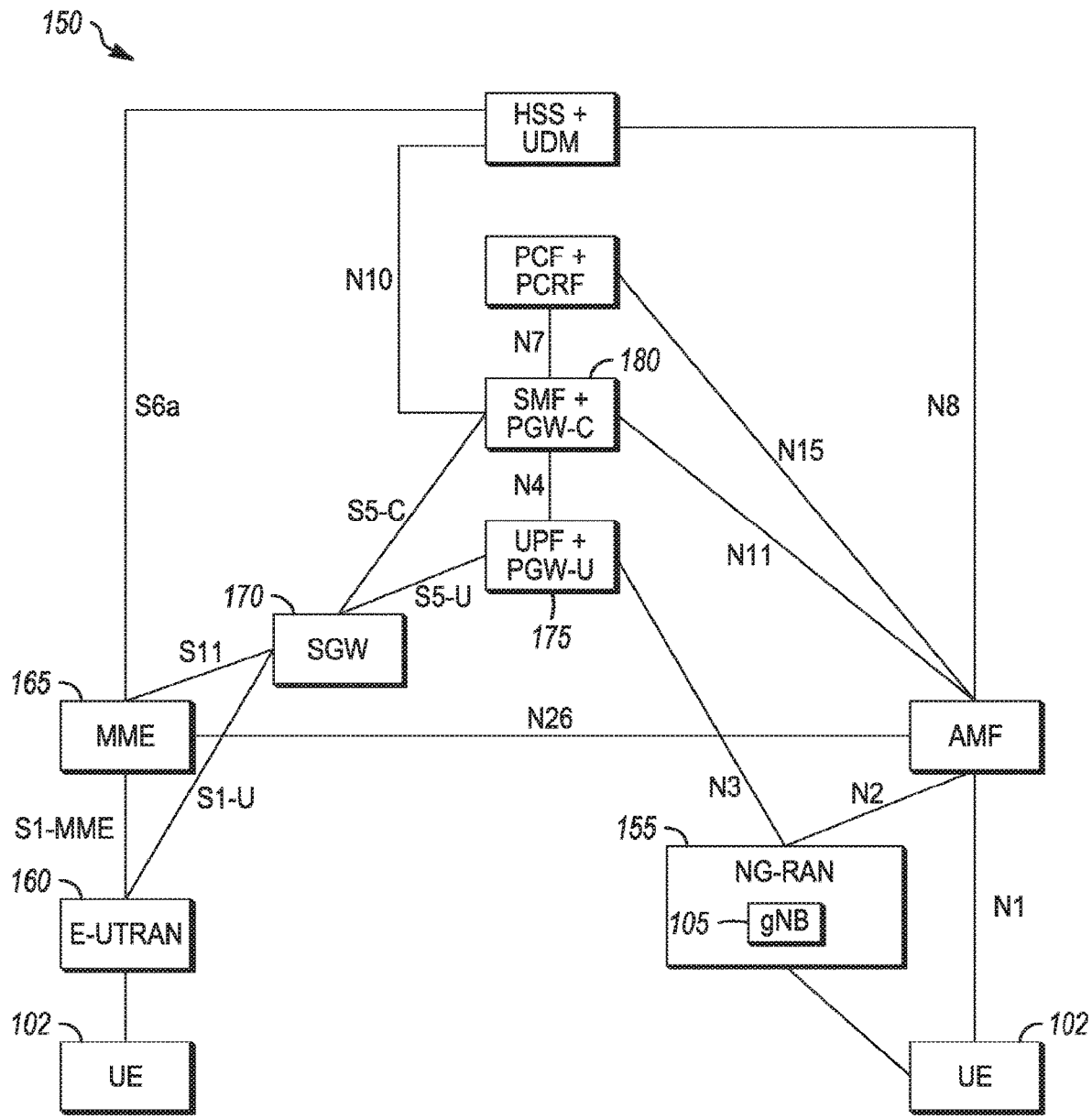
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

In some embodiments, an NG-RAN may support Multi-RAT Dual Connectivity (MR-DC) operation whereby a UE 102 in RRC_CONNECTED is configured to utilize radio resources provided by two distinct schedulers, located in two different NG-RAN nodes connected via a non-ideal backhaul and providing either E-UTRA (i.e. if the node is an ng-eNB 104) or NR access (i.e. if the node is a gNB 105).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
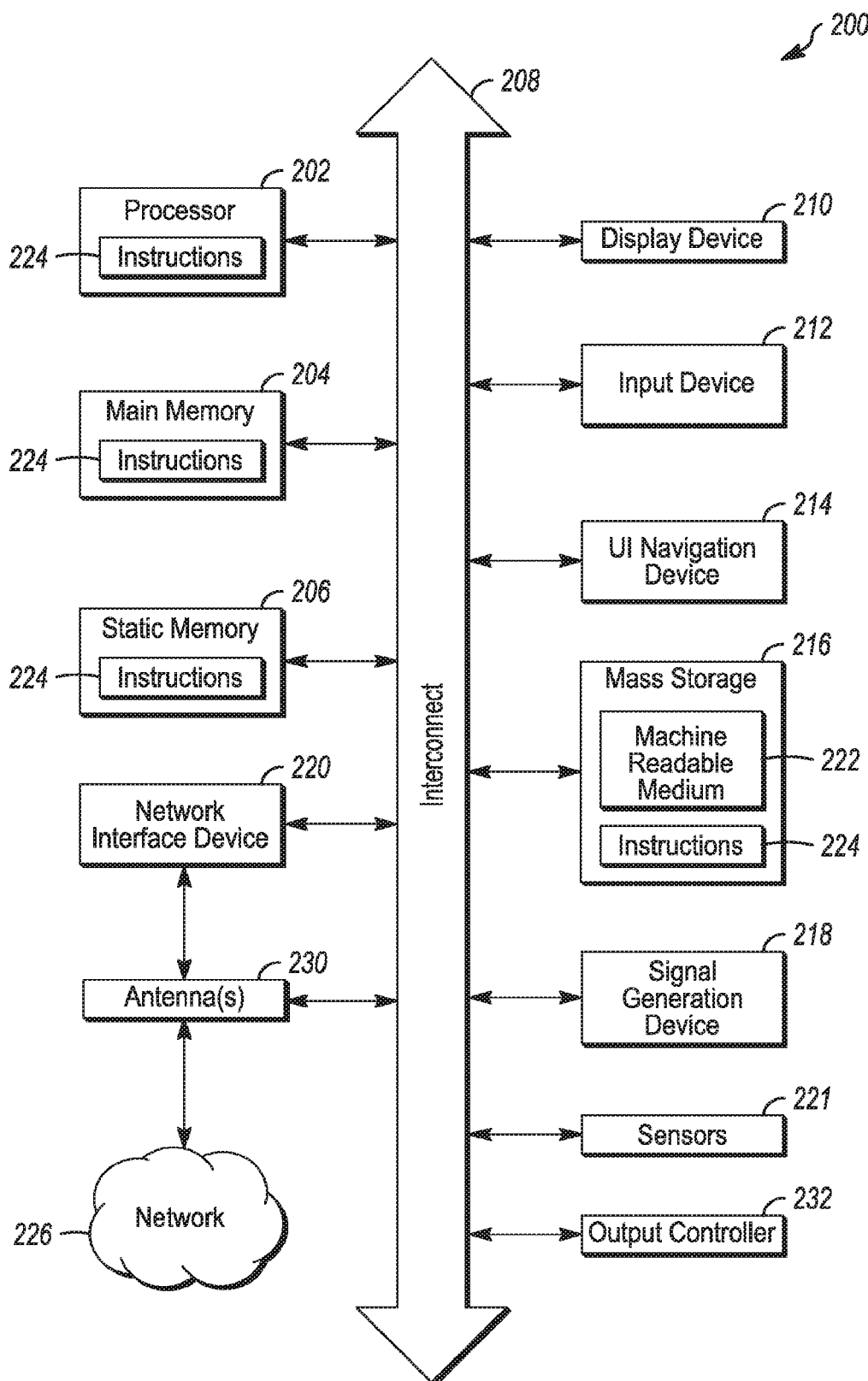
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
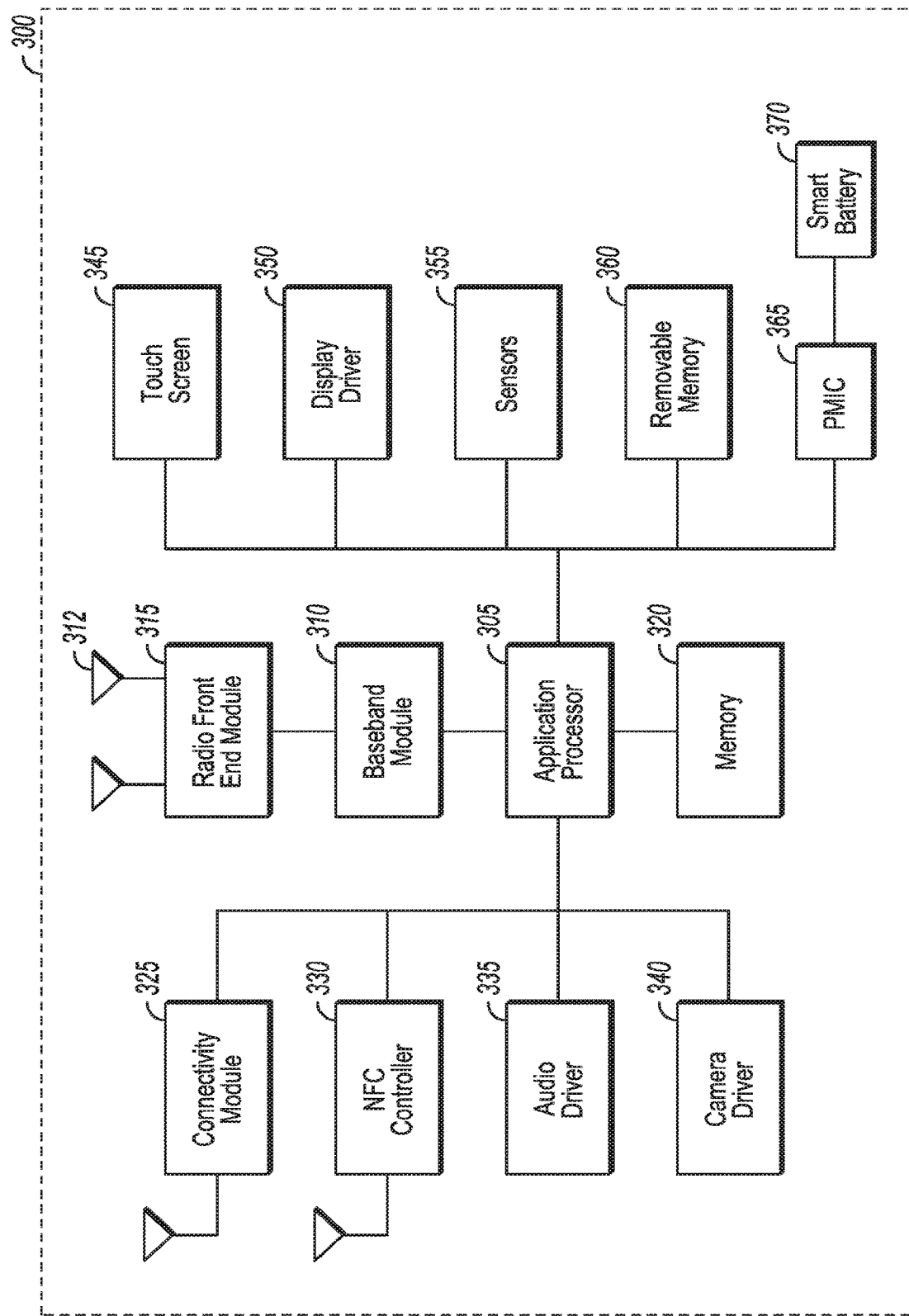
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
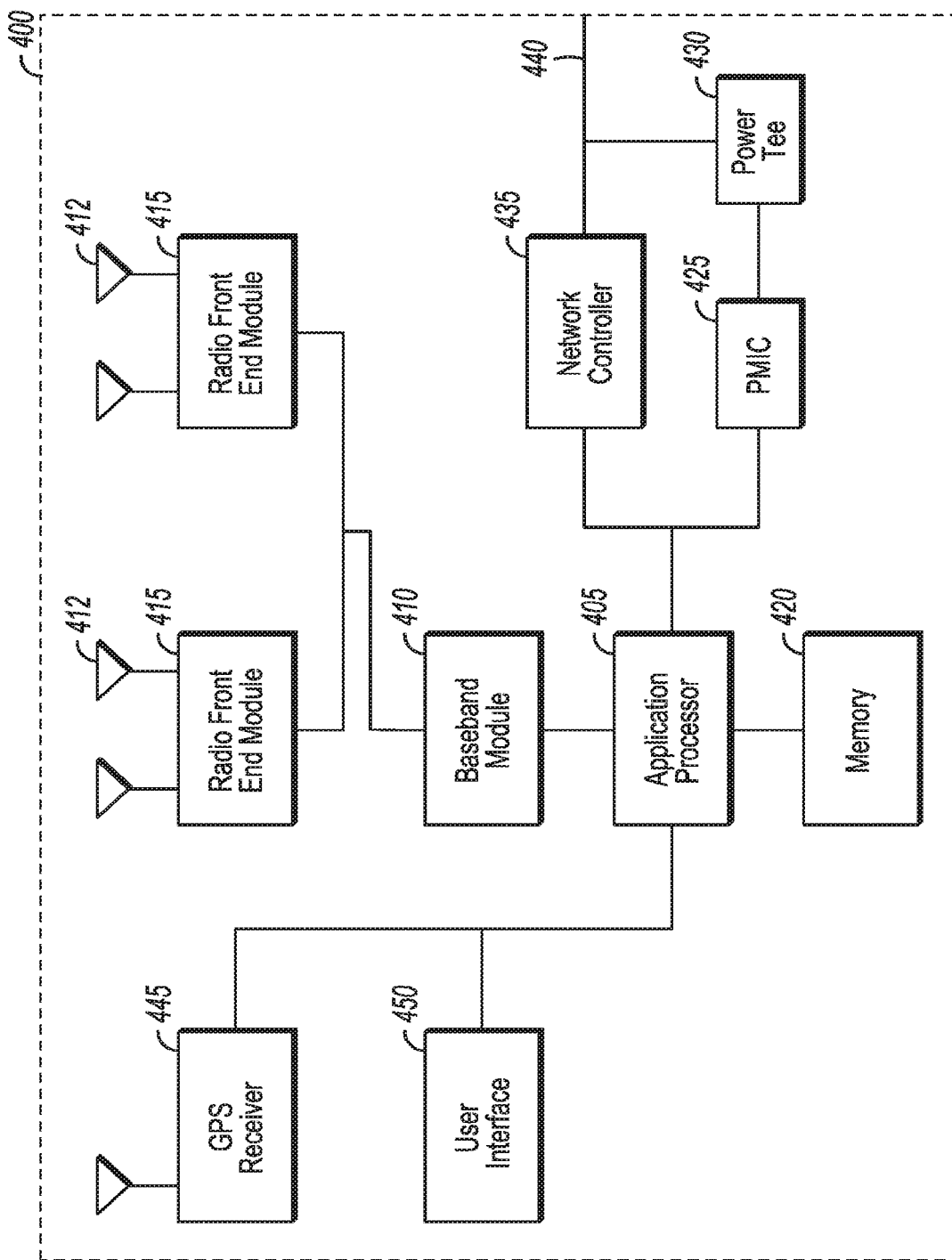
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a next generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
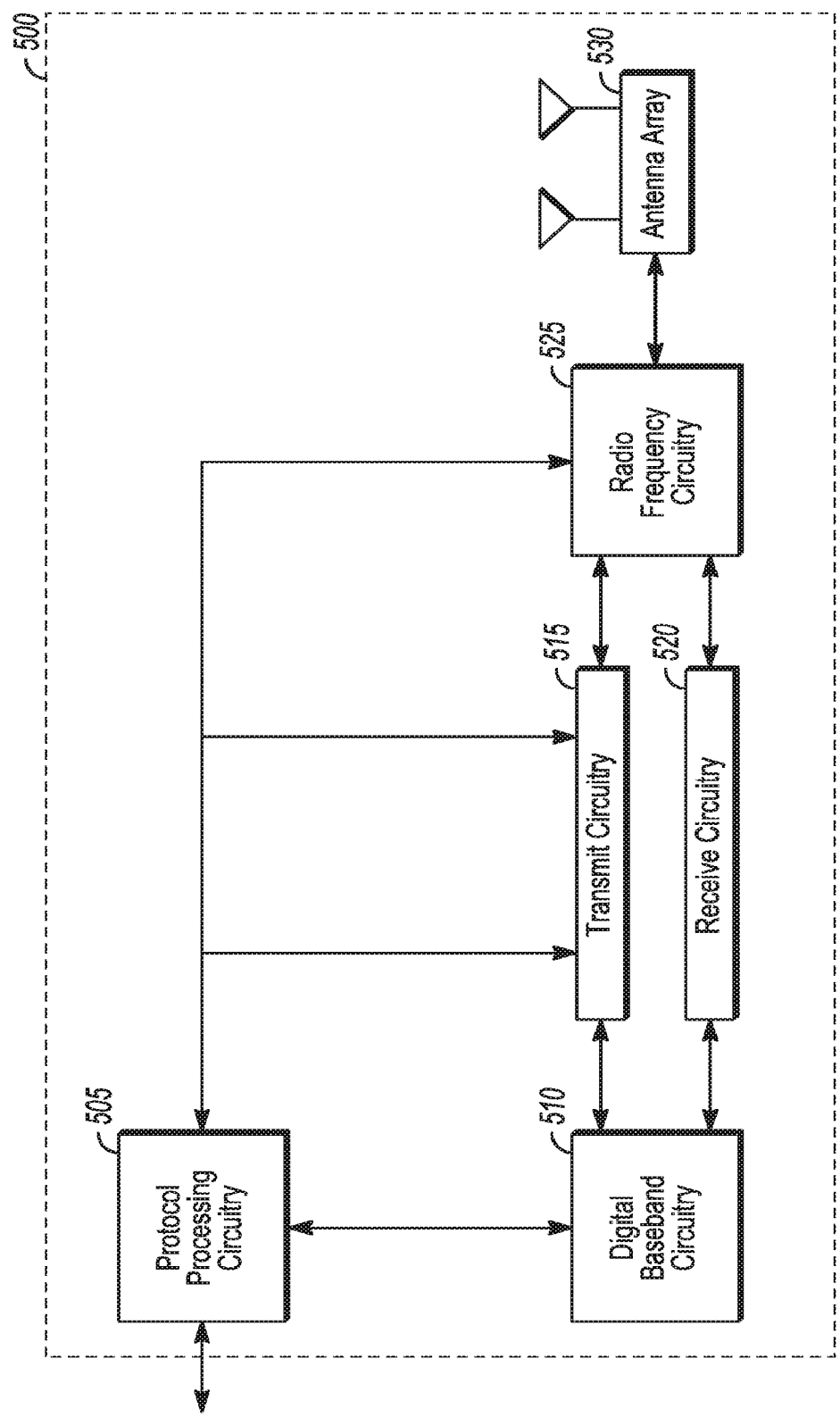
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure. RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

In accordance with some embodiments, a gNB 105 may be configurable to operate as a master gNB (MgNB) 105. The MgNB 105 may transmit radio-resource control (RRC) signaling to provide information for configuring a UE 102 with a configuration for a secondary cell group (SCG) for dual connectivity to allow the UE 102 to utilize radio resources of both a master cell group (MCG) associated with the MgNB 105 and the SCG. The SCG may be associated with a secondary gNB (SgNB) 105. The MgNB 105 may determine, based on inactivity of the UE 102, a transition of the UE 102 from an RRC connected mode to an RRC inactive mode. The MgNB 105 may transmit, to the SgNB 105, an SgNB release request message that indicates a partial suspension of the dual connectivity based on the transition of the UE 102 from the RRC connected mode to the RRC inactive mode, wherein as part of the partial suspension: a first portion of the configuration for the SCG is to be maintained and a second portion of the configuration for the SCG is to be released. These embodiments are described in more detail below.

Figure 6:
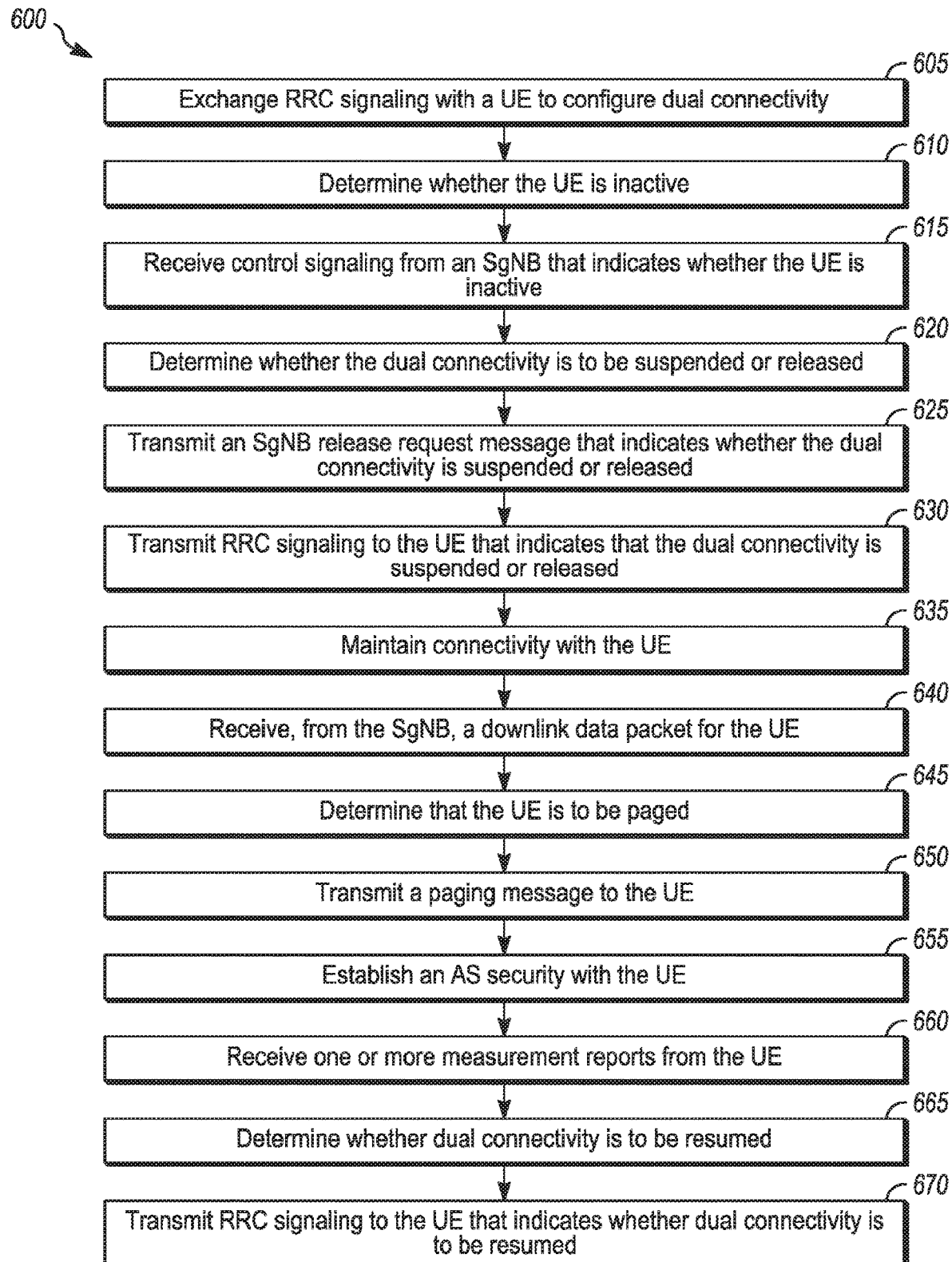
FIG. 6 illustrates the operation of a method of communication in accordance with some embodiments.

FIG. 6 illustrates the operation of a method of communication in accordance with some embodiments. It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to one or more of FIGS. 1A, 1B, 2-5 and 7-12, although it is understood that the method 600 may be practiced with any other suitable systems, interfaces and components.

In some embodiments, a gNB 105 may perform one or more operations of the method 600, but embodiments are not limited to performance of the method 600 and/or operations of it by the gNB 105. In some embodiments, an eNB 104 configured to operate as a gNB 105 may perform one or more operations of the method 600 (and/or similar operations). In some embodiments, an eNB 104 may perform one or more operations of the method 600 (and/or similar operations). In some embodiments, the UE 102 may perform one or more operations of the method 600 (and/or similar operations). Accordingly, although references may be made to performance of one or more operations of the method 600 by the gNB 105 in descriptions herein, it is understood that the eNB 104 and/or UE 102 may perform one or more of the same operations, in some embodiments. It is also understood that the eNB 104 and/or UE 102 may perform one or more similar operations, in some embodiments. It is also understood that the eNB 104 and/or UE 102 may perform one or more reciprocal operations, in some embodiments.

In some embodiments, the gNB 105 may be arranged to operate in accordance with a New Radio (NR) standard and/or protocol, although the scope of embodiments is not limited in this respect. While the method 600 and other methods described herein may refer to eNBs 104, gNBs 105 or UEs 102 operating in accordance with 3GPP standards, 5G standards, NR standards and/or other standards, embodiments of those methods are not limited to just those eNBs 104, gNBs 105 or UEs 102 and may also be practiced on other devices, such as a Wi-Fi access point (AP) or user station (STA). In addition, the method 600 and other methods described herein may be practiced by wireless devices configured to operate in other suitable types of wireless communication systems, including systems configured to operate according to various IEEE standards such as IEEE 802.11. The method 600 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 600, 700 and 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

In some embodiments, a gNB 105 configurable to operate as a master gNB (MgNB) 105 may perform one or more operations of the method 600, although the scope of embodiments is not limited in this respect. In descriptions herein, references to an MgNB 105 and/or secondary gNB (SgNB) 105 are not limiting. Such references may be used for clarity, in some cases. In some embodiments, a gNB 105 may be configurable to operate as an MgNB 105. In some embodiments, a gNB 105 may be configurable to operate as an SgNB 105. In some embodiments, a gNB 105 may be configurable to operate as an MgNB 105 or as an SgNB 105. In some embodiments, a gNB 105 may be configurable to operate as an MgNB 105 and as an SgNB 105.

In some embodiments, the MgNB 105 may be arranged to operate in accordance with a New Radio (NR) protocol and/or standard, although the scope of embodiments is not limited in this respect. In some embodiments, the SgNB 105 may be arranged to operate in accordance with an NR protocol and/or standard, although the scope of embodiments is not limited in this respect At operation 605, the MgNB 105 may exchange RRC signaling with a UE 102 to configure dual connectivity. The RRC signaling may be included in a 3GPP standard, NR standard and/or other standard, in some embodiments. It should be noted that embodiments are not limited to usage of the RRC signaling in this operation and/or other operations described herein, as any suitable message(s) and/or signaling may be used.

In some embodiments, the MgNB 105 may transmit RRC signaling to provide configuration information for configuring the UE 102 with a secondary cell group (SCG) for dual connectivity to allow the UE 102 to utilize radio resources of both a master cell group (MCG) associated with the MgNB 105 and the SCG. In some embodiments, the MgNB 105 may transmit RRC signaling to provide information to configure the UE 102 with a configuration for an SCG for dual connectivity to allow the UE 102 to utilize radio resources of both an MCG associated with the MgNB 105 and the SCG. The SCG may be associated with a secondary gNB (SgNB) 105. In some embodiments, the MgNB 105 may transmit the RRC signaling to the UE 102, although the scope of embodiments is not limited in this respect.

At operation 610, the MgNB 105 may determine whether the UE 102 is inactive. In a non-limiting example, the MgNB 105 may determine inactivity of the UE 102 based on an expiration of an RRC inactivity timer at the MgNB 105.

At operation 615, the MgNB 105 may receive control signaling from an SgNB 105 that indicates whether the UE 102 is inactive. In some embodiments, the MgNB 105 may receive, from the SgNB, control signaling that indicates the inactivity of the UE 102.

It should be noted that some embodiments may not necessarily include all operations shown in FIG. 6. In a non-limiting example, some embodiments may not necessarily include operation 615, and the inactivity of the UE 102 may be determined by the MgNB 105 using operation 610 (and/or other operation(s)).

At operation 620, the MgNB 105 may determine whether the dual connectivity is to be suspended or released. In some embodiments, the MgNB 105 may determine whether the dual connectivity is to be suspended. In some embodiments, the MgNB 105 may determine whether the dual connectivity is to be partially suspended. In some embodiments, the MgNB 105 may determine whether the dual connectivity is to be released.

In some embodiments, one or more of the following may be used: release of the dual connectivity, suspension of the dual connectivity, partial suspension of the dual connectivity and/or other. In a non-limiting example, one of the above may be used. For instance, a first embodiment may support the partial suspension of the dual connectivity and a second embodiments may support the release of the dual connectivity.

In some embodiments, the MgNB 105 may determine, based on inactivity of the UE 102, a transition of the UE 102 from an RRC connected mode to an RRC inactive mode. In some embodiments, the MgNB 105 may determine that the dual connectivity is to be suspended based on one or more of: detected inactivity of the UE 102, the transition of the UE 102 from an RRC connected mode to an RRC inactive mode and/or other. In some embodiments, the MgNB 105 may determine that the dual connectivity is to be at least partially suspended based on one or more of: detected inactivity of the UE 102, the transition of the UE 102 from an RRC connected mode to an RRC inactive mode and/or other. In some embodiments, the MgNB 105 may determine that the dual connectivity is to be released based on one or more of: detected inactivity of the UE 102, the transition of the UE 102 from an RRC connected mode to an RRC inactive mode and/or other.

In some embodiments, in a partial suspension of the dual connectivity, a signaling radio bearer (SRB) between the SgNB 105 and the UE 102 may be maintained, and a data radio bearer (DRB) between the SgNB 105 and the UE 102 may be released. In some embodiments, in a partial suspension of the dual connectivity, a DRB between the SgNB 105 and the UE 102 may, be maintained, and an SRB between the SgNB 105 and the UE 102 may be released.

In some embodiments, in a partial suspension of the dual connectivity, a first portion of a UE context for the SgNB 105 may be maintained and a second portion of the UE context for the SgNB 105 may be released. In a non-limiting example, the UE context may include one or more SRBs, information related to the SRBs, one or more DRBs, information related to the DRBs and/or other.

In some embodiments, as part of the partial suspension of the dual connectivity: a first portion of the configuration for the SCG may be maintained, and a second portion of the configuration for the SCG may be released. In a non-limiting example, the first and second portions of the configuration may include one or more parameters related to one or more of: a packet data convergence protocol (PDCP) layer and a service data application protocol (SDAP) layer. In another non-limiting example, the first and second portions of the configuration may include one or more parameters related to one or more of: a radio link control (RLC) layer and a medium access control (MAC) layer.

In another non-limiting example, as part of the partial suspension of the dual connectivity, a signaling radio bearer (SRB) between the SgNB 105 and the UE 102 may be maintained and a data radio bearer (DRB) between the SgNB 105 and the UE 102 may be released.

At operation 625, the MgNB 105 may transmit an SgNB release request message that indicates whether the dual connectivity is to be suspended or released. In some embodiments, the MgNB 105 may transmit an SgNB release request message that indicates whether the dual connectivity is to be suspended. In some embodiments, the MgNB 105 may transmit an SgNB release request message that indicates whether the dual connectivity is to be released.

The SgNB release request message may be included in a 3GPP standard, NR standard and/or other standard, in some embodiments. It should be noted that embodiments are not limited to usage of the SgNB release request message in this operation and/or other operations described herein, as any suitable message(s) and/or signaling may be used.

In some embodiments, the SgNB release request message may indicate one or more of: a suspension of the dual connectivity, a partial suspension of the dual connectivity, a release of the dual connectivity and/or other.

In some embodiments, the SgNB release request message may be transmitted to the SgNB 105 on an Xx interface or an Xn interface, although the scope of embodiments is not limited in this respect.

At operation 630, the MgNB 105 may transmit RRC signaling to the UE 102 that indicates that the dual connectivity is suspended or released. In some embodiments, the MgNB 105 may transmit RRC signaling to the UE 102 that indicates whether the dual connectivity is suspended. In some embodiments, the MgNB 105 may transmit RRC signaling to the UE 102 that indicates whether the dual connectivity is partially suspended. In some embodiments, the MgNB 105 may transmit RRC signaling to the UE 102 that indicates whether the dual connectivity is released.

At operation 635, the MgNB 105 may maintain connectivity with the UE 102. In some embodiments, the MgNB 105 may maintain connectivity with the UE 102 after the dual connectivity is released. In some embodiments, the MgNB 105 may maintain connectivity with the UE 102 during the suspension of the dual connectivity. In some embodiments, the MgNB 105 may maintain connectivity with the UE 102 during the partial suspension of the dual connectivity. In some embodiments, the MgNB 105 may maintain a configuration for the UE 102. In some embodiments, the MgNB 105 may maintain the configuration for the UE 102 after the dual connectivity is released. In some embodiments, the MgNB 105 may maintain the configuration for the UE 102 during the suspension of the dual connectivity. In some embodiments, the MgNB 105 may maintain the configuration for the UE 102 during the partial suspension of the dual connectivity.

In some embodiments, the MgNB 105 may maintain a UE context for communication between the MgNB 105 and the UE 102 after the release of the dual connectivity. In some embodiments, the MgNB 105 may maintain a UE context for communication between the MgNB 105 and the UE 102 during the suspension of the dual connectivity. In some embodiments, the MgNB 105 may maintain a UE context for communication between the MgNB 105 and the UE 102 during the partial suspension of the dual connectivity.

In some embodiments, the UE context may include one or more signaling radio bearers (SRBs), information related to the SRBs, one or more data radio bearers (DRBs), information related to the DRBs and/or other.

At operation 640, the MgNB 105 may receive, from the SgNB 105, a downlink data packet for the UE 102. At operation 645, the MgNB 105 may determine that the UE 102 is to be paged. At operation 650, the MgNB 105 may transmit a paging message to the UE 102.

In some embodiments, the MgNB 105 may determine that the UE 102 is to be paged based on reception of a downlink data packet from the SgNB 105 to be forwarded to the UE 102, wherein the downlink data packet is received after the release of the dual connectivity. In some embodiments, the MgNB 105 may determine that the UE 102 is to be paged based on reception of a downlink data packet from the SgNB 105 to be forwarded to the UE 102, wherein the downlink data packet is received after the suspension of the dual connectivity. In some embodiments, the MgNB 105 may determine that the UE 102 is to be paged based on reception of a downlink data packet from the SgNB 105 to be forwarded to the UE 102, wherein the downlink data packet is received after the partial suspension of the dual connectivity.

In some embodiments, the MgNB 105 may transmit a paging message to page the UE 102 for transmission of the downlink data packet by the MgNB 105.

At operation 655, the MgNB 105 may establish an AS security with the UE 102.

At operation 660, the MgNB 105 may receive one or more measurement reports from the UE 102. At operation 665, the MgNB 105 may determine whether dual connectivity is to be resumed. In some embodiments, the MgNB 105 may determine whether the dual connectivity established at operation 605 is to be resumed.

In some embodiments, the one or more measurement reports may be received from the UE 102 during the partial suspension of the dual connectivity. In some embodiments, the one or more measurement reports may be received from the UE 102 during the suspension of the dual connectivity. In some embodiments, the one or more measurement reports may be received from the UE 102 after the release of the dual connectivity.

In some embodiments, the one or more measurement reports may include information related to the SgNB 105 and/or the dual connectivity. In a non-limiting example, a measurement report may include a signal quality measurement for the SgNB 105 at the UE 102. In some embodiments, the MgNB 105 may determine whether the dual connectivity is to be resumed with the SgNB 105 based on one or more of: signal quality measurement(s) for the SgNB, measurement reports and/or other.

Example signal quality measurements include, but are not limited to, signal-to-noise ratio (SNR), reference signal received power (RSRP), reference signal received quality (RSRQ), and received signal strength indicator (RSSI).

In some embodiments, the MgNB 105 may determine whether the dual connectivity is to be resumed with the SgNB 105 based on one or more measurement reports received from the UE, wherein: the measurement reports received from the UE 102 after the AS security is established are used for the determination, and the measurement reports received from the UE 102 before the AS security is established are not used for the determination.

In some embodiments, the MgNB 105 may receive a message (including but not limited to a message 3 (Msg-3) of a 3GPP protocol and/or NR protocol) that includes information related to connectivity of the UE 102 and/or location of the UE 102. In a non-limiting example, the message may be received after the dual connectivity has been suspended, partially suspended or released. In some embodiments, the message may be a Msg-3. In some embodiments, the message may be a message received after a Msg-3.

The MgNB 105 may determine, based at least partly on the information related to connectivity of the UE 102 and/or location of the UE 102, whether the dual connectivity is to be resumed with the SgNB 105. In some embodiments, the information related to connectivity of the UE 102 and/or location of the UE 102 may include one or more of: whether the UE 102 is in a cell in which a UE context is stored, whether the UE 102 is in a same location as during a previous communication with the MgNB 105, whether the SCG for the dual connectivity is valid and/or other information.

At operation 670, the MgNB 105 may transmit RRC signaling to the UE that indicates whether dual connectivity is to be resumed. In some embodiments, the MgNB 105 may transmit the RRC signaling to indicate whether the dual connectivity established at operation 605 is to be resumed.

In some embodiments, the MgNB 105 may transmit, to the UE 102, a message (including but not limited to a message 4 (Msg-4) of a 3GPP protocol and/or NR protocol)) that indicates whether the dual connectivity is to be resumed with the SgNB 105. In some embodiments, the message may be encoded in accordance with the AS security, although the scope of embodiments is not limited in this respect. In some embodiments, the message may be a Msg-4. In some embodiments, the message may be a message transmitted after a Msg-4.

Some of the messages and/or signaling described herein may be included in a standard and/or protocol, including but not limited to Third Generation Partnership Project (3GPP), 3GPP Long Term Evolution (LTE). Fourth Generation (4G), Fifth Generation (5G), New Radio (NR) and/or other. The scope of embodiments is not limited to usage of elements that are included in standards, however.

In some embodiments, an apparatus of the MgNB 105 may comprise memory. The memory may be configurable to store at least a portion of the SgNB release request message. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to encoding of the SgNB release request message. The apparatus may include a transceiver to transmit the SgNB release request message. The transceiver may transmit and/or receive other blocks, messages and/or other elements.

Figure 7:
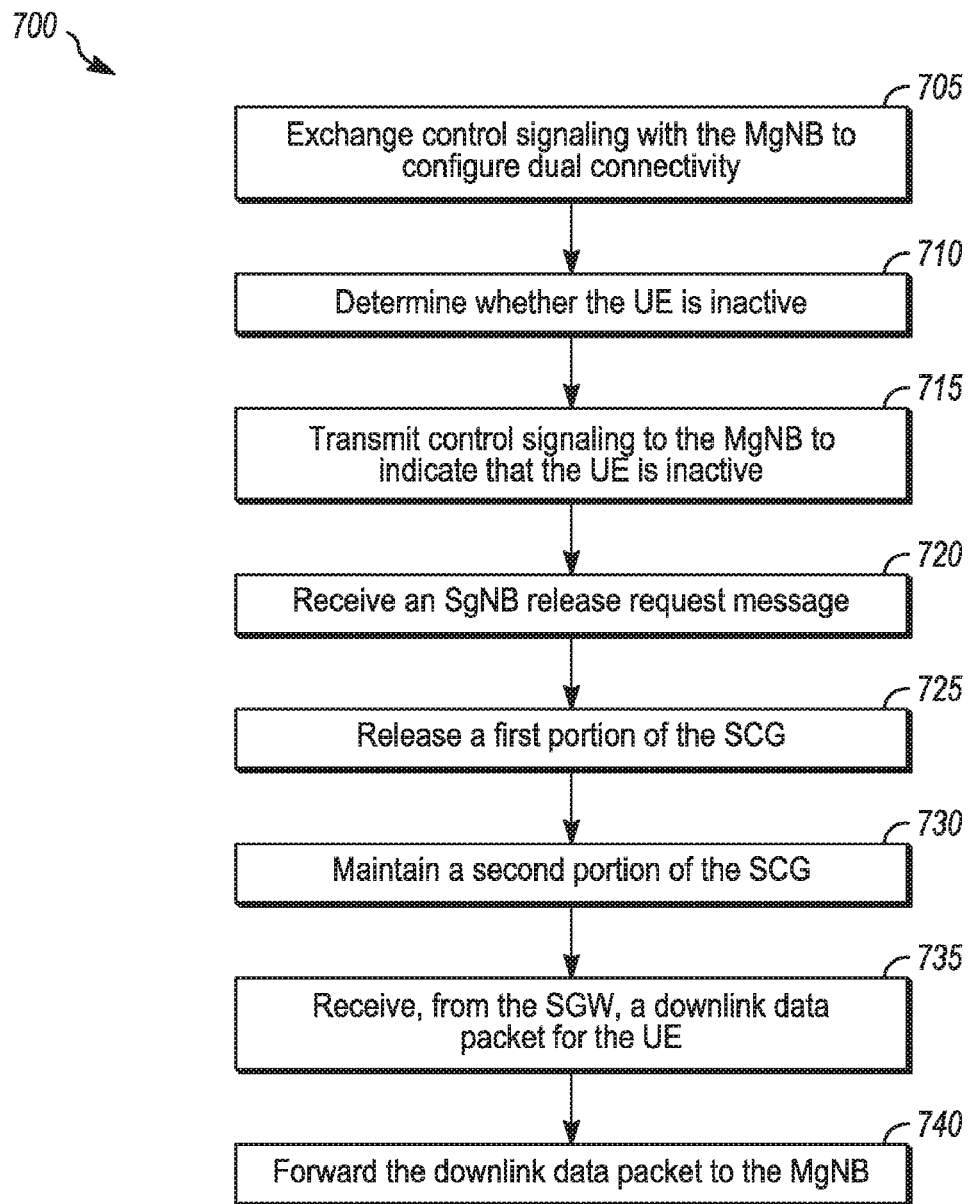
FIG. 7 illustrates the operation of another method of communication in accordance with some embodiments.
Figure 8:
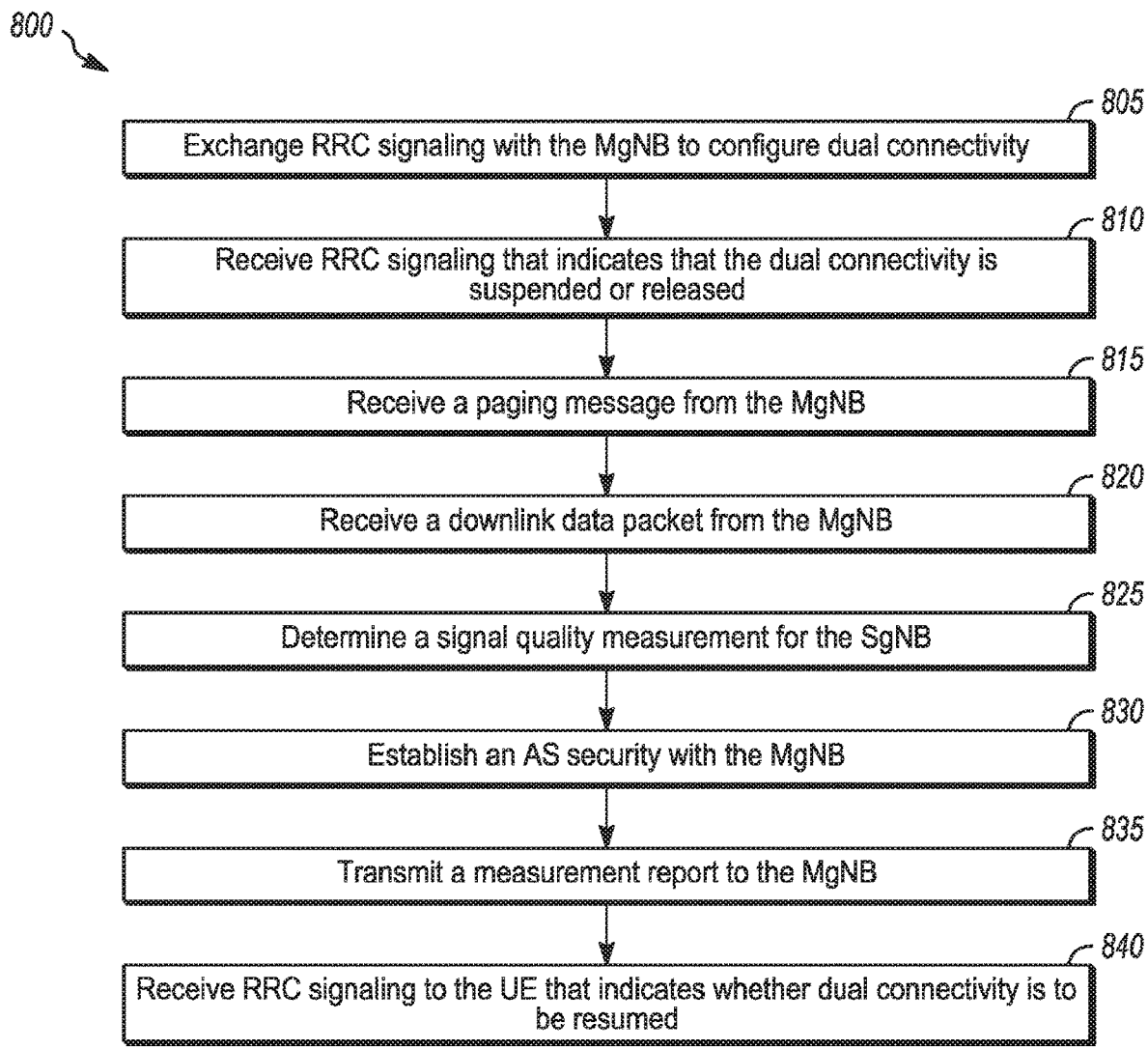
FIG. 8 illustrates the operation of another method of communication in accordance with some embodiments.

FIG. 7 illustrates the operation of another method of communication in accordance with some embodiments. FIG. 8 illustrates the operation of another method of communication in accordance with some embodiments. Embodiments of the methods 700 and 800 may include additional or even fewer operations or processes in comparison to what is illustrated in FIGS. 7-8 and embodiments of the methods 700 and/or 800 are not necessarily limited to the chronological order that is shown in FIGS. 7-8. In describing the methods 700 and/or 800, reference may be made to one or more of the figures described herein, although it is understood that the methods 700 and/or 800 may be practiced with any other suitable systems, interfaces and components. In addition, embodiments of the methods 700 and/or 800 may be applicable to UEs 102, eNBs 104, gNBs 105, APs, STAs and/or other wireless or mobile devices. The methods 700 and/or 800 may also be applicable to an apparatus of a UE 102, eNB 104, gNB 105 and/or other device described above.

In some embodiments, a gNB 105 (including but not limited to a gNB 105 configurable to operate as an SgNB 105) may perform one or more operations of the method 700, but embodiments are not limited to performance of the method 700 and/or operations of it by the SgNB 105. In some embodiments, the eNB 104 and/or UE 102 may perform one or more operations of the method 700 (and/or similar operations). Although references may be made to performance of one or more operations of the method 700 by the SgNB 105 in descriptions herein, it is understood that the MgNB 105, eNB 104 and/or UE 102 may perform: one or more of the same operations; one or more similar operations; and/or one or more reciprocal operations, in some embodiments.

In some embodiments, a UE 102 may perform one or more operations of the method 800, but embodiments are not limited to performance of the method 800 and/or operations of it by the UE 102. In some embodiments, the eNB 104, MgNB 105, SgNB 105 and/or gNB 105 may perform one or more operations of the method 800 (and/or similar operations). Although references may be made to performance of one or more operations of the method 800 by the UE 102 in descriptions herein, it is understood that the eNB 104, MgNB 105, SgNB 105 and/or gNB 105 may perform: one or more of the same operations; one or more similar operations; and/or one or more reciprocal operations, in some embodiments.

It should be noted that one or more operations of one of the methods 600, 700, 800 may be the same as, similar to and/or reciprocal to one or more operations of the other methods. For instance, an operation of the method 600 may be the same as, similar to and/or reciprocal to an operation of the method 700, in some embodiments. In a non-limiting example, an operation of the method 600 may include transmission of an element (such as a frame, block, message and/or other) from MgNB 105 to the SgNB 105, and an operation of the method 700 may include reception of a same element (and/or similar element) from the MgNB 105 by the SgNB 105. In some cases, descriptions of operations and techniques described as part of one of the methods 600, 700, 800 may be relevant to one or both of the other methods.

In addition, previous discussion of various techniques and concepts may be applicable to the methods 700 and/or 800 in some cases, including but not limited to dual connectivity, suspension of dual connectivity, partial suspension of dual connectivity, release of dual connectivity, MgNB 105, SgNB 105, SCG, MCG, Xn interface, Xx interface, messages (including but not limited to messages described regarding the method 600) and/or other. In addition, the examples shown in one or more of the figures may also be applicable, in some cases, although the scope of embodiments is not limited in this respect.

In some embodiments, a gNB 105 configurable to operate as an SgNB 105 may perform one or more operations of the method 700, although the scope of embodiments is not limited in this respect. In some embodiments, the SgNB 105 may be arranged to operate in accordance with a New Radio (NR) protocol and/or standard, although the scope of embodiments is not limited in this respect.

At operation 705, the SgNB 105 may exchange control signaling with the MgNB 105 to configure dual connectivity. In some embodiments, the SgNB 105 may receive, from the MgNB 105, control signaling that includes configuration information for configuring a UE 102 with a secondary cell group (SCG) for dual connectivity to allow the UE 102 to utilize radio resources of both a master cell group (MCG) associated with the MgNB 105 and the SCG. The SCG may be associated with the SgNB 105.

At operation 710, the SgNB 105 may determine whether the UE 102 is inactive. In some embodiments, the SgNB 105 may determine whether the UE 102 is to be put into an inactive mode. In a non-limiting example, the SgNB 105 may determine, based on a time duration elapsed since a previous uplink communication from the UE 102, whether the UE 102 is inactive. In another non-limiting example, the SgNB 105 may determine, based on a time duration elapsed since a previous uplink communication from the UE 102, whether the UE 102 is to be put into the inactive mode.

At operation 715, the SgNB 105 may transmit control signaling to the MgNB to indicate that the UE is inactive. In some embodiments, the control signaling may be transmitted on an Xx or an Xn interface between the SgNB 105 and the MgNB 105, although the scope of embodiments is not limited in this respect.

It should be noted that some embodiments may not necessarily include all operations shown in FIG. 7. In a non-limiting example, some embodiments may not necessarily include operations 710-715, and the inactivity of the UE 102 may be determined by the MgNB 105.

At operation 720, the SgNB 105 may receive an SgNB release request message. At operation 725, the SgNB 105 may release a first portion of the SCG. At operation 730, the SgNB 105 may maintain a second portion of the SCG.

In some embodiments, the SgNB 105 may receive, from the MgNB 105, an SgNB release request message that indicates a partial suspension of the dual connectivity, wherein: a data radio bearer (DRB) between the SgNB 105 and the UE 102 is to be released, and a signaling radio bearer (SRB) between the SgNB 105 and the UE 102 is to be maintained.

In some embodiments, the SgNB release request message may be received on an Xx or an Xn interface between the SgNB 105 and the MgNB 105, although the scope of embodiments is not limited in this respect.

At operation 735, the SgNB 105 may receive, from the SGW 124, a downlink data packet for the UE 102. At operation 740, the SgNB 105 may forward the downlink data packet to the MgNB 105.

In some embodiments, the downlink data packet received at operation 735 may be received during a partial suspension of the dual connectivity. In some embodiments, the downlink data packet received at operation 735 may be received during a suspension of the dual connectivity. In some embodiments, the downlink data packet received at operation 735 may be received after a release of the dual connectivity.

In some embodiments, an apparatus of the SgNB 105 may comprise memory. The memory may be configurable to store information related to the information related to the SgNB release request message. The memory may store one or more other elements and the apparatus may use them for performance of one or more operations. The apparatus may include processing circuitry, which may perform one or more operations (including but not limited to operation(s) of the method 700 and/or other methods described herein). The processing circuitry may include a baseband processor. The baseband circuitry and/or the processing circuitry may perform one or more operations described herein, including but not limited to decoding of the SgNB release request message. The apparatus may include a transceiver to receive the SgNB release request message. The transceiver may transmit and/or receive other blocks, messages and/or other elements.

At operation 805, the UE 102 may exchange RRC signaling with the MgNB 105 to configure dual connectivity. At operation 810, the UE 102 may receive RRC signaling that indicates that the dual connectivity is suspended or released. At operation 815, the UE 102 may receive a paging message from the MgNB 105. At operation 820, the UE 102 may receive a downlink data packet from the MgNB 105. At operation 825, the UE 102 may determine a signal quality measurement for the SgNB 105. At operation 830, the UE 102 may establish an AS security with the MgNB 105. At operation 835, the UE 102 may transmit a measurement report to the MgNB 105. At operation 840, the UE 102 may receive RRC signaling to the UE that indicates whether dual connectivity is to be resumed.

It should be noted that in descriptions herein of one or more operations, methods and/or techniques, the UE 102 may exchange signaling, messages, packets and/or other elements with the MgNB 105. Such references are not limiting, however. In some embodiments, the UE 102 may exchange the same or similar signaling, messages, packets and/or other elements with other base station components. For instance, such a base station component may be configured to operate in accordance with an Evolved Universal Terrestrial Radio Access (E-UTRA) New Radio Dual Connectivity (EN-DC) technique/protocol/standard.

In some embodiments, the MgNB 105 may operate in accordance with an NR technique/protocol and a secondary eNB (SeNB) 104 may operate in accordance with an LTE technique/protocol. This may be in accordance with an NR EUTRA (NE-DC) arrangement, although the scope of embodiments is not limited in this respect.

In some embodiments, the UE 102 may receive, from the MgNB 105, first RRC signaling that includes configuration information for configuring the UE 102 with a secondary cell group (SCG) for dual connectivity to allow the UE 102 to utilize radio resources of both a master cell group (MCG) associated with the MgNB 105 and the SCG. The SCG may be associated with the SgNB 105. The UE 102 may receive, from the MgNB 105, second RRC signaling that indicates a suspension of the dual connectivity. The UE 102 may, during the suspension of the dual connectivity: monitor for paging messages from the MgNB; determine a signal quality measurement based on a downlink signal received from the SgNB 105; transmit, to the MgNB 105, a measurement report that indicates the signal quality measurement; and/or other operation(s).

In some embodiments, the UE 102 may receive control signaling from the MgNB 105 for an establishment of an access stratum (AS) security. In some embodiments, the UE 102 may encode the measurement report in accordance with the AS security, although the scope of embodiments is not limited in this respect.

In some embodiments, the UE 102 may be configured with a first medium access control (MAC) entity for the MCG, and the UE 102 may be configured with a second MAC entity for the SCG. In some embodiments, the UE 102 may be configured with the first and second MAC entities as part of the dual connectivity, although the scope of embodiments is not limited in this respect.

In some embodiments, as part of the partial suspension of the dual connectivity, the UE 102 may maintain a first portion of the configuration for the SCG and may release a second portion of the configuration for the SCG. In a non-limiting example, the first and second portions of the configuration may include one or more parameters related to one or more of: a packet data convergence protocol (PDCP) layer and a service data application protocol (SDAP) layer. In another non-limiting example, the first and second portions of the configuration may include one or more parameters related to one or more of: a radio link control (RLC) layer and a medium access control (MAC) layer.

In another non-limiting example, as part of the partial suspension of the dual connectivity, a signaling radio bearer (SRB) between the SgNB 105 and the UE 102 may be maintained and a data radio bearer (DRB) between the SgNB 105 and the UE 102 may be released.

In some embodiments, an apparatus of the UE 102 may comprise memory. The memory may be configurable to store a signal quality measurement. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of RRC signaling. The apparatus may include a transceiver to receive RRC signaling. The transceiver may transmit and/or receive other blocks, messages and/or other elements.

Figure 9:
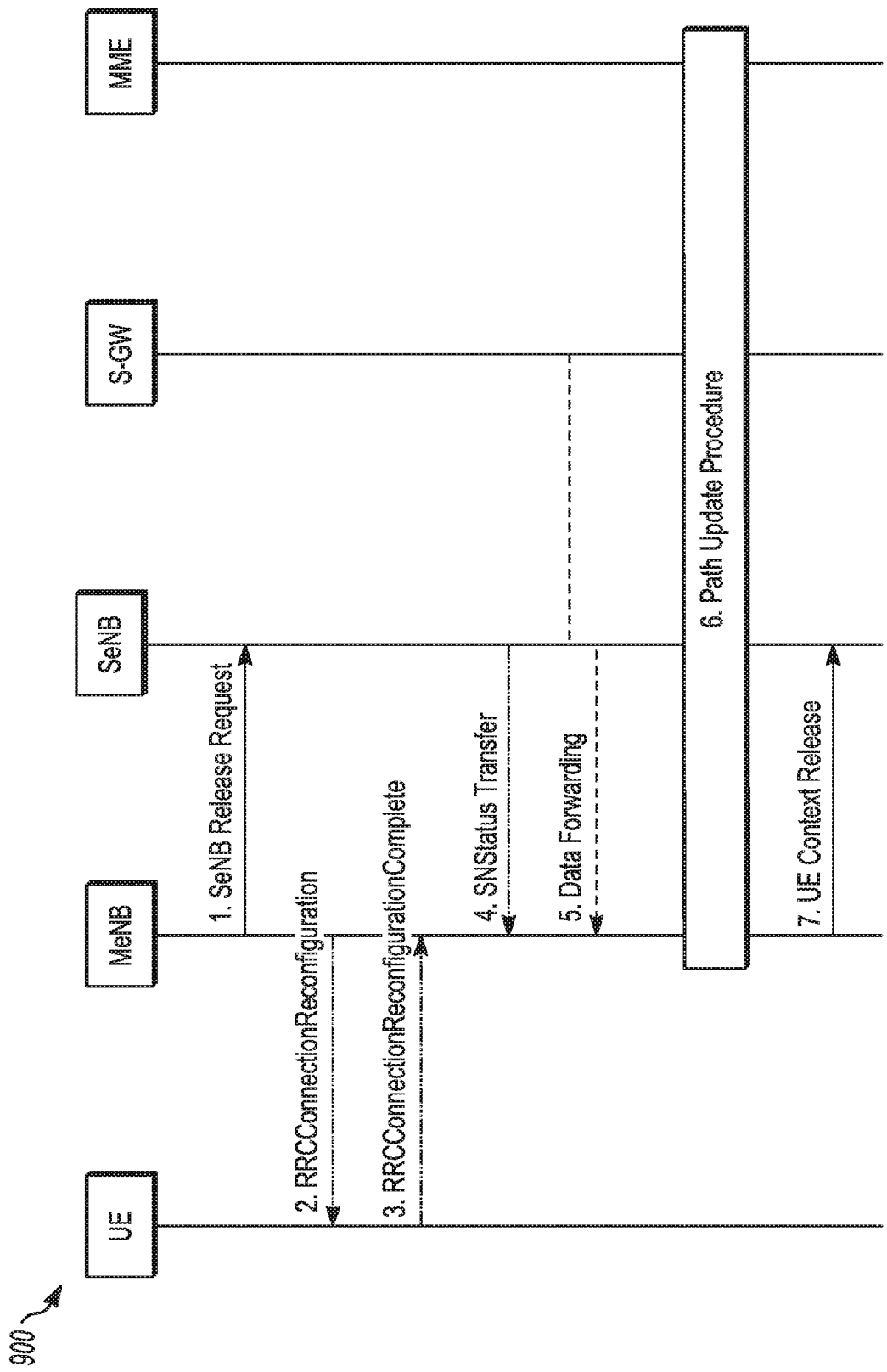
FIG. 9 illustrates example operations in accordance with some embodiments.
Figure 10:
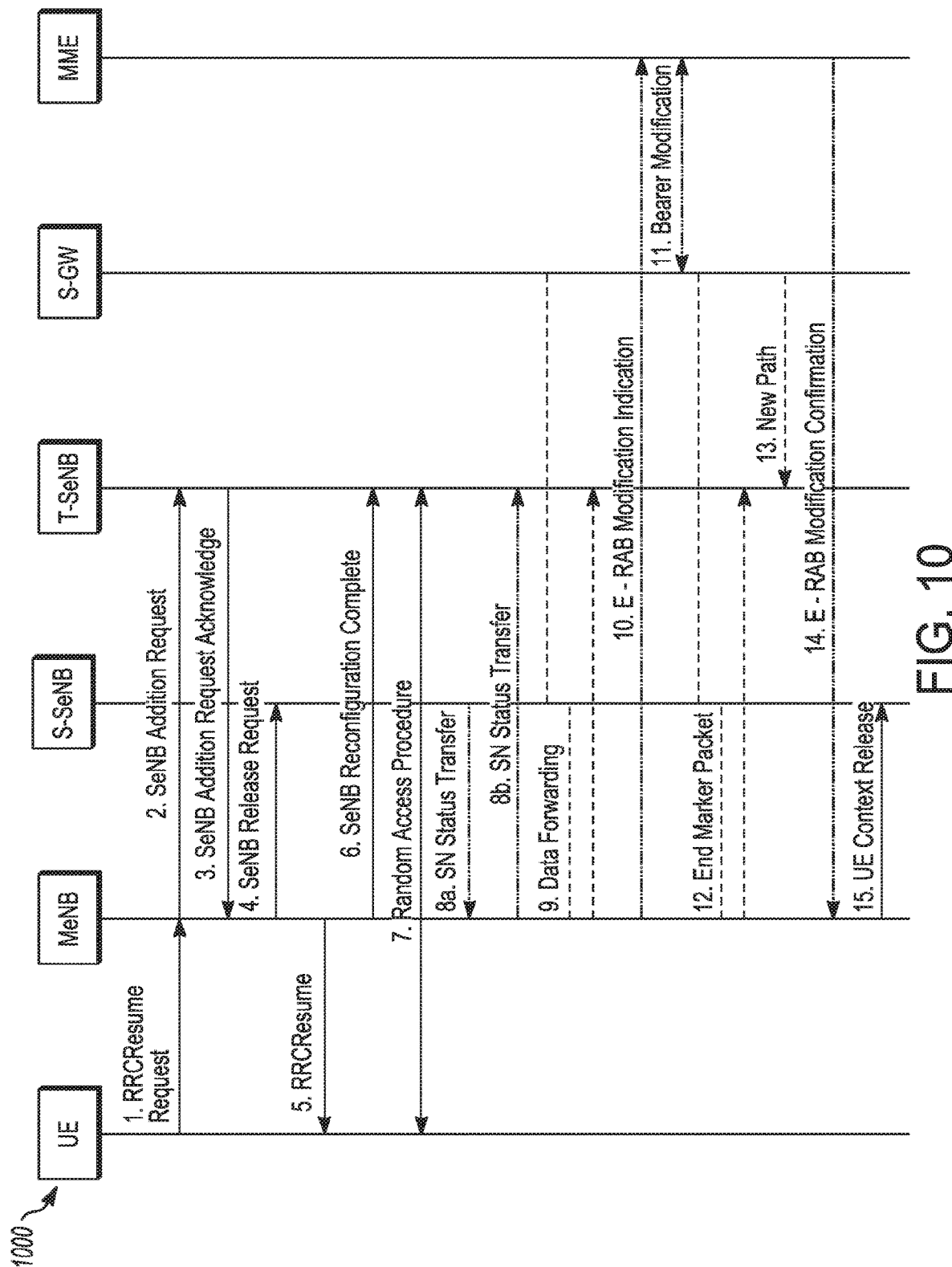
FIG. 10 illustrates additional example operations in accordance with some embodiments.
Figure 11:
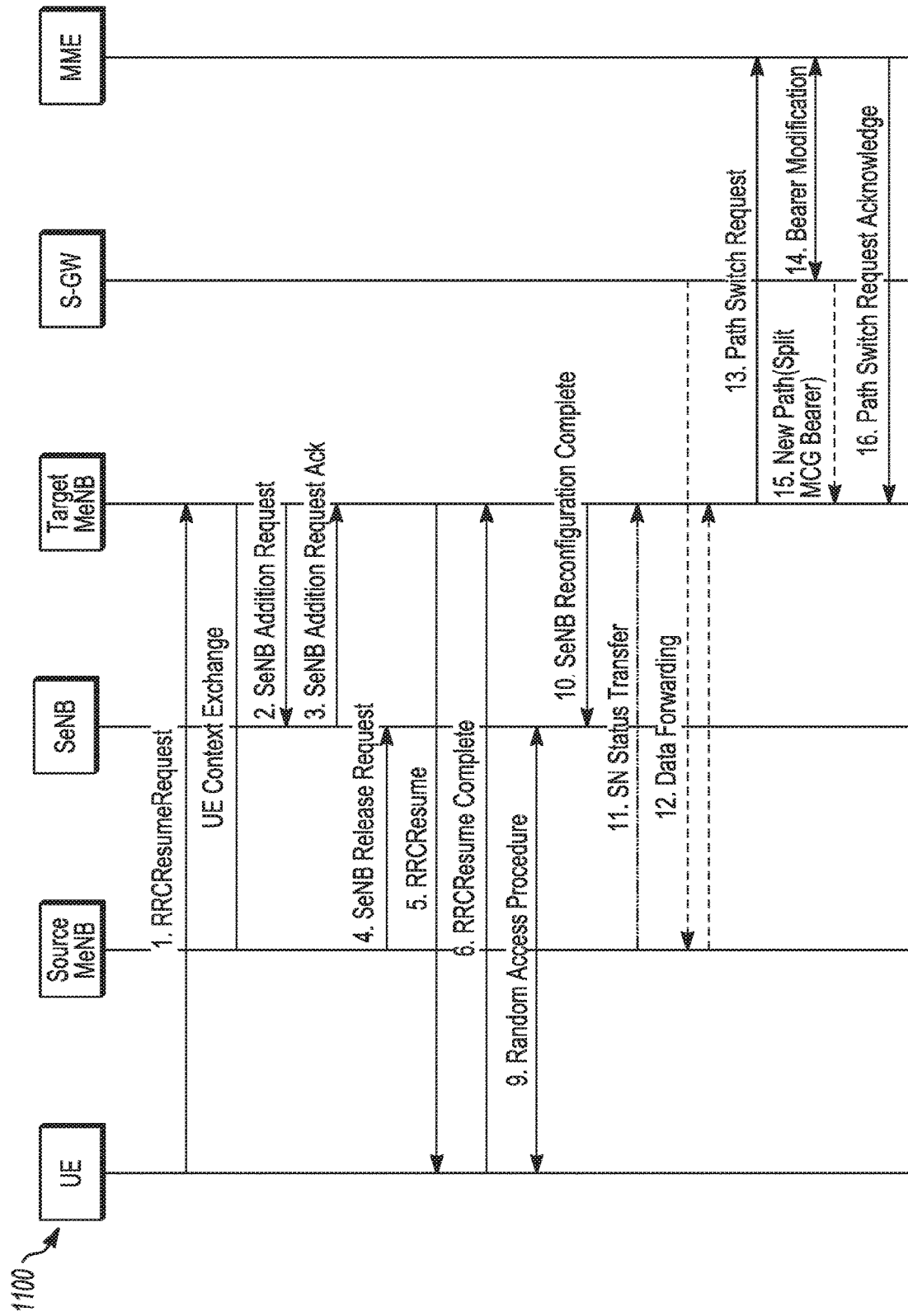
FIG. 11 illustrates additional example operations in accordance with some embodiments.

FIG. 9 illustrates example operations in accordance with some embodiments. FIG. 10 illustrates additional example operations in accordance with some embodiments. FIG. 11 illustrates additional example operations in accordance with some embodiments. It should be noted that the examples shown in FIGS. 9-11 may illustrate some or all of the concepts and techniques described herein in some cases, but embodiments are not limited by the examples. For instance, embodiments are not limited by the name, number, type, size, ordering, arrangement and/or other aspects of the operations, messages, gNBs 105, UEs 102, and other elements as shown in FIGS. 9-11. Although some of the elements shown in the examples of FIGS. 9-11 may be included in a 3GPP LTE standard, 5G standard, NR standard and/or other standard, embodiments are not limited to usage of such elements that are included in standards.

In some embodiments, a method may enable the resumption, suspension and/or RAN-initiated paging of UEs 102 that were configured with Dual Connectivity (DC) while they were in connected mode.

In some embodiments, the DC configuration may be released. When a UE 102 enters an inactive mode, an SgNB 105 configuration and configured SgNB bearers may be released. In some cases, this technique may be considered a baseline mechanism, although the scope of embodiments is not limited in this respect.

In some embodiments, the DC configuration may be suspended. When the UE 102 enters the inactive mode, the UE 102 may keep an SCG configuration and an MCG configuration. It is also possible that a first portion of a configuration may be suspended and a second portion of the configuration may be released. In a non-limiting example, an SCG DRB configuration may be kept while other remaining SCG configuration may be released. In some cases, this technique may be considered an improved/optimized mechanism (such as in comparison to the baseline mechanism described above), although the scope of embodiments is not limited in this respect.

It should be noted that techniques, operations and/or methods described herein may use exemplary names or references, but the scope of embodiments is not limited by such exemplary names and references. In some embodiments, one or more of the techniques, operations and/or methods described herein may be applicable to the suspension or inactivation mechanism, as well as to the resumption or activation mechanism. In some embodiments, one or more of the techniques, operations and/or methods described herein may be applicable to NR, LTE, as well as other technologies. In some embodiments, one or more of the techniques, operations and/or methods described herein may be applicable to a state or sub-state defined for a UE suspended or inactive that may be referred to as inactive, light connection and/or similar. In some embodiments, one or more of the techniques, operations and/or methods described herein may be applicable to Xn or Xx signalling, and may also be applicable to other CN signaling, such as signaling over interface N2/N3 or X2 or S1. In some embodiments, one or more of the techniques, operations and/or methods described herein may be applicable to enable DC between two nodes that may be referred to as MgNB and SgNB, or alternatively MCG and SCG, or in another different way.

In some cases, descriptions herein of a message, technique, operation and/or method may refer to an MgNB 105, but such references are not limiting. In some cases, the message, technique, operation and/or method may be applicable to an MeNB 104, eNB 104, gNB 105 and/or other device, in some embodiments. In a non-limiting example, an MeNB 104 may be used instead of an MgNB 105, in some embodiments. In another non-limiting example, a message label, message contents, message function and/or other aspect may refer to an MgNB 105, but a same message and/or similar message (in terms of message label, message contents, message function and/or other aspect) may be used for an MeNB 104, in some embodiments.

Similarly, in some cases, descriptions herein of a message, technique, operation and/or method may refer to an SgNB 105, but such references are not limiting. In some cases, the message, technique, operation and/or method may be applicable to an SeNB 104, eNB 104, gNB 105 and/or other device, in some embodiments.

In some embodiments, in accordance with NR operation, non-limiting examples of Dual Connectivity (DC) use cases are given in the table below. In some embodiments, one or more additional use cases may be possible. In some embodiments, one or more of the use cases in the table below may not necessarily be included.

| Options | MgNB | SgNB | CN |
| --- | --- | --- | --- |
| #0 NR-DC | NR-RAN | NR-RAN | 5GC |
| #3 EN-DC | RAN | NR-RAN | EPC |
| #7 NGEN-DC | RAN | NR-RAN | 5GC |
| #4 NE-DC | NR-RAN | RAN | 5GC |

In some embodiments, a DC configuration may be released when the UE 102 enters an inactive mode. For instance, an SgNB 105 configuration and configured SgNB bearers may be released. For this technique (release of the DC configuration), one or more of the following may be applicable, although the scope of embodiments is not limited in this respect. In some cases, RAN-initiated paging mechanism may not necessarily be impacted (as DL data is received by MgNB). In some cases, one or more existing procedures may be used. In some cases, DC may be released due to inactivity even before UE 102 is put into the inactive mode.

In some cases, potentially unnecessary signaling (such as signaling over RAN and CN interfaces) may be generated for the suspension and resumption cases in which the UE 102 may not have changed its location. The reason is that upon suspension of the UE 102, the MgNB 105 may notify the SgNB 105 that the UE 102 enters into the inactive mode (which may trigger the release of the SgNB configuration/bearers). However, after resumption, if the UE 102 is still in the same cell/location, the MgNB 105 may want to enable again the SgNB configuration/bearers. Hence a transition to the inactive mode may no longer be transparent to the CN.

In some embodiments, techniques to reduce a number of messages may be used, such as combining of reconfiguration and release.

In some embodiments, a DC configuration may be suspended when the UE 102 enters an inactive mode. For instance, the UE 102 may keep the SCG configuration and/or the MCG configuration. In this approach, it is also possible that only a part of SCG configuration may be suspended and one or more other parts may be released (which may be similar to techniques used for the DC configuration on LTE re-establishment, although the scope of embodiments is not limited in this respect). For instance, the DRB configuration may be kept while other remaining SCG configuration may be released.

For this technique (suspension of the DC configuration), one or more of the following may be applicable, although the scope of embodiments is not limited in this respect. In some cases, a savings of signaling (for instance, signaling over RAN and CN interfaces) may result for the suspension and resumption cases in which the UE 102 has not changed its location (for instance, a same RAN area, such as a cell, in which the UE AS context is stored). In some cases, potentially unnecessary signaling (for instance, signaling over RAN and CN interfaces) may result for the suspension and resumption cases in which the UE 102 has changed its location to a different RAN area in which the UE AS context is not stored. In some cases, a RAN-initiated paging mechanism may be impacted (as DL data is received by SgNB 105 when the RAN-initiated paging is handled by the MgNB 105) and additional CN signaling may result.

For this technique (suspension of the DC configuration), one or more of the following may be applicable, although the scope of embodiments is not limited in this respect. In some cases, upon resumption for mobile terminating case, DL Data forwarding handling in SgNB 105 may be required for UEs 102 in an inactive mode if the UE 102 has changed its location to a different RAN area (such as a cell) in which the UE AS context is not stored. It should be noted that for an MCG split bearer, this may not be needed (for instance, if the PDCP is located in the MCG).

For this technique (suspension of the DC configuration), one or more of the following may be applicable, although the scope of embodiments is not limited in this respect. In some cases, an update of resumption procedure may be performed to enable the reconfiguration of SgNB 105. Some indication from the UE 102 on whether the current SgNB or another SgNB is suitable may be used. Measurement reporting for this may need an initiation of AS security, which may result in a multi-step approach wherein security is first activated, measurement results are received, and SN is configured. The DRBs (at least the split and SCG DRBs) may remain suspended during this period. In comparison to other techniques, an increase in signaling over the radio may result, although CN signaling may be reduced if the UE 102 has not moved. The UE 102 may be asked to perform measurements on NR so it has results ready to provide if requested. In some embodiments, as a potential improvement/optimization, an indication that the current SgNB 105 is still suitable in Resume request from the UE 102 can be considered. Since this does not involve measurement reports, it can be sent unencrypted in some cases. In some cases, a procedure to activate security and obtain measurement reports may only be needed if UE 102 has moved.

For this technique (suspension of the DC configuration), one or more of the following may be applicable, although the scope of embodiments is not limited in this respect. In some cases, if the UE 102 has not moved, the current SCG configuration may be resumed. If the UE 102 has moved, a procedure that combines parts of inter-gNB resume, MN HO and SN change may be used to move the UE contexts to the new MN and SN along with any data forwarding.

In some embodiments, the MgNB 105 may need to know whether the SgNB configuration is valid/applicable or not for a given UE 102. In some embodiments, the UE 102 may report measurements. In some cases, the AS security may need to be resumed before the measurements can be provided. In some embodiments, the UE 102 may report information. The UE 102 may provide location information of the UE 102 that may enable the gNB 105 to determine one or more of: whether the UE 102 is still in the same cell/location as indicated in the UE AS Context (that is, the same as before suspension of the RRC Connection); whether the SgNB configuration is still suitable; and/or other. In some embodiments, the location information from the UE 102 may be conveyed within MSG3 (such as an RRC Connection Resume Request message and/or other). In some embodiments, the location information from the UE 102 may include one or more flags, one or more bits and/or other, which may be used to indicate information such as: if the UE 102 and RAN are synchronized; the location/cell to which the information refers; and/or other.

Regarding the location of the UE 102, different scenarios are possible. In some cases in which the UE 102 is in the inactive mode has not moved from its previous location/cell, for the resumption mechanism: upon MSG4, the MgNB 105 may reconfigure one or more of the MgNB or SgNB configurations or bearers. In some cases in which the UE 102 is in the inactive mode and has moved from its previous location/cell, the resumption mechanism may be updated, and at least the following options are possible.

In a first option, AS security may be enabled/resumed and reconfiguration may be performed. For instance, the resumption may enable/resume the AS security and the reconfiguration may enable/resume some or all bearers at the same time. Partial resumption of MgNB bearers may be done while resuming (via MSG4) while SgNB bearers/configuration may be resumed afterwards. In a second option, an RRC message 4 may be sent by the RAN node encrypted or unencrypted (which may depend on whether the NCC key and potentially encryption algorithm needs to be updated).

In some embodiments, when the UE 102 enters the inactive mode, configured bearers may be reconfigured to MCG bearers as DC configuration is released. In some cases, this may be performed by UE autonomous reconfigure bearer to MCG bearer. In some cases, the MgNB may perform explicit reconfiguration before sending the UE 102 to the inactive mode. In some cases, the UE 102 and the network side may need to be aware the DC configuration is released. In the above, the network side may include one or more RAN nodes (for instance. MgNB 105 and SgNB 105) and may include one or more CN nodes (for instance, AMF or UPF).

In some embodiments, the MgNB 105 may be use an MgNB initiated SgNB/SeNB release procedure to inform SgNB/SeNB to release the SCG configuration. An example of such a procedure based on the LTE DC is shown in FIG. 9.

In some embodiments, CN signaling between the MgNB 105 and SgNB 105 may be used to notify and potentially even confirm the release of the DC configuration. In a non-limiting example, signaling that is included in a procedure (including but not limited to release or reconfiguration) may be used. For instance. Xn or Xx signaling may be used as SeNB Release Request may be required for Option 0 and 4 (with one or more messages related to hand shake). One or more Xn messages for the MgNB 105 to coordinate with SgNB/SeNB when the UE 102 enters the inactive mode may be used, in some embodiments.

In some embodiments, the SgNB 105 may inform the MgNB 105 when the UP path is not active. A "user inactivity" cause value may be used, for instance in the SeNB initiated SeNB Modification. A non-limiting example of the user inactivity field is given below.

| User Inactivity | The action is requested due to user inactivity on all E-RABs, e.g., S1 is requested to be released in order to optimise the radio resources; or SeNB didn't see activity on the DRB recently. In current version of this specification applicable for Dual Connectivity only |
|---|---|

In some embodiments, CN signaling may be exchanged between the MgNB 105 and SgNB 105 to notify and potentially even confirm when user inactivity is triggered and when the suspension is done. In a non-limiting example, signaling that is included in a procedure (including but not limited to modification, release or reconfiguration) may be used. For instance, Xn or Xx signaling related to SeNB initiated SeNB Modification message (with one or more messages related to hand shake) may be used. One or more Xn messages may be used for the SeNB 105 to inform the MeNB when suspension of the RRC connection could be considered due to certain data inactivity.

In some embodiments, on the RRC level, the following options are possible on how to handle the SgNB release while moving the connected UE 102 to the inactive mode. In a first option, the MgNB 105 may transmit an RRC connection reconfiguration message that includes the information to release SCG configuration and may transmit an RRC connection release message to inform the UE 102 of its transition into the inactive mode. In a second option, the MgNB 105 may transmit an RRC connection release message that informs the UE 102 of the release of the SCG configuration (implicitly or explicitly) and further informs the UE 102 of its transition into the inactive mode.

In some embodiments, when the UE 102 enters the inactive mode, the UE 102 may keep the SgNB configuration and the MgNB configuration. An indication to notify when the UE 102 enters or exits the inactive mode may be sent by the MgNB 105. For instance, the MgNB 105 may inform the SgNB 105 when the UE 102 enters and exits from the inactive mode to enable the SgNB 105 to know and/or determine when to notify the MgNB 105 and buffer incoming DL data. In some cases, CN signaling may be used between the MgNB 105 and the SgNB 105 to notify when the UE 102 enters/exits from the inactive mode. In some embodiments, the signaling may be based on one or more procedures (including but not limited to release or reconfiguration). For instance, Xn or Xx signaling may be used. In some embodiments, one or more messages related to hand shake may be used. In some embodiments, one or more Xn messages may be used for the MgNB 105 to coordinate with SgNB 105 when a UE 102 enters the inactive mode or exits the inactive mode. In a non-limiting example, 2 or 4 such messages may be used.

In some embodiments, a trigger from SgNB 105 of RAN-initiated paging may be required and/or used when new DL data reaches the SgNB 105/SeNB 104. The MgNB 105 may control the RAN-initiated paging within the RNA, therefore SgNB 105/SeNB 104 may need to inform the MgNB 105 when new DL data is received for a UE 102 that is in the inactive mode. Alternatively, the RAN-initiated paging may be fully or partially controlled by the SgNB 105 for UEs 102 in the active mode.

In some embodiments, CN signaling between the MgNB 105 and SgNB 105 may be used to notify when new DL data arrives for a given UE 102 in the inactive mode. This signaling may be related to a procedure (including but not limited to release or reconfiguration). For instance, Xn or Xx signaling may be used. In some embodiments, one or more message related to hand shake may be used. In some embodiments, one or more Xn messages may be sent by the SgNB 105/SeNB 104 to inform the MgNB 105 when new DL data arrives for a UE 102 in the inactive mode. In a non-limiting example, for MO access, two or four Xn messages may be used. In another non-limiting example, for MT access, four or six Xn messages may be used.

In some embodiments, while the UE 102 is in a connected mode (including but not limited to RRC_CONNECTED), the SgNB 105 may inform the MgNB 105 when suspension of the RRC connection could be considered due to certain data inactivity. In some embodiments, data forwarding from SgNB 105/SeNB 104 may need to be enabled over the network interfaces (such as Xn, Xx. NG-c and/or other). In some embodiments, if no MgNB 105 and SgNB 105/SeNB 104 change during a transition of the UE 102 from an inactive mode to an active mode, data forwarding may not necessarily be needed.

In some embodiments, if no MgNB 105 change occurs but a change of SgNB 105/SeNB 104 during the transition of the UE 102 from the inactive mode to the active mode, there may be a need to perform a procedure (such as an LTE DC follow procedure, similar procedure and/or other procedure) during the resumption of the RRC Connection. An example of such a procedure is illustrated in FIG. 10.

In some embodiments, if a change of MgNB 105 occurs but no change of SgNB 105/SeNB 104 occurs during the transition of the UE 102 from the inactive mode to the active mode, there may be a need to perform a procedure (such as an LTE DC follow procedure, similar procedure and/or other procedure) during the resumption of the RRC Connection. An example of such a procedure is illustrated in FIG. 11.

In some embodiments, if there is a change in both the MgNB 105 and the SgNB 105/SeNB 104 during the transition of the UE 102 from the inactive mode to the active mode, a procedure may be performed. In a non-limiting example, the procedure may be similar to one of the procedures in FIG. 10 or FIG. 11, except that the SgNB Addition procedure may be performed with a new SgNB 105 and further data forwarding from the S-SgNB 105 to the T-SgNB 105 may be performed.

In some embodiments, instead of suspension of all of a DC configuration, one part of it may be suspended and another part may be released. In a non-limiting example, a procedure may be used, wherein the procedure may be similar to a procedure performed in LTE with the DC configuration on LTE re-establishment. In the LTE re-establishment procedure, the SCG configuration may be released but the DRB configuration for the DRB Type may be maintained upon RRC connection re-establishment. For instance, the following (or similar) may be performed: release the entire SCG configuration, if configured, except for the DRB configuration (as configured by drb-ToAdd-ModListSCG). In some embodiments, this may be maintained until the first RRC Connection Reconfiguration message in which the SgNB 105 may configure accordingly on whether to continue maintaining the DRB type or to reconfigure them to other DRB type (for instance, an MCG bearer). In some embodiments, if a similar mechanism were enabled for the inactive mode, the gNB 105 may indicate via RACH MSG4 (such as RRCConnectionResume and/or other) the desirable reconfiguration. For instance, the message may indicate whether to continue maintaining the DRB type or to reconfigure them to another DRB type. In some embodiments, this may be an autonomous release of the configuration by the UE 102 (for instance, the MgNB 105 and SgNB 105 may still keep the configuration. In some cases, the SgNB configuration that is released when the UE 102 enters the inactive mode may be provided.

In some cases, a signaling trade-off may be realized (when a UE enters an inactive mode) between a first approach, wherein a DC configuration is released and other approaches, wherein some level of DC configuration is kept. For instance, a trade-off between two or more of the following may be realized: potential (de)configuration of DC in some (or all) CONNECTED/INACTIVE transmission, additional Xn signaling to handle the suspension of DC in some (or all) CONNECTED/INACTIVE transmission, update(s) of RAN-initiated paging and/or other.

In some embodiments, one or more techniques (including but not limited to the techniques described herein) may enable resumption, suspension and RAN-initiated paging of UEs 102 that were configured with Dual Connectivity (DC) while they were in an RRC connected mode. In some embodiments, the DC configuration may be released. In some embodiments, CN signaling (such as Xn or Xx) between the MgNB 105 and SgNB 105 may be used to notify and potentially confirm the release of the DC configuration. In some embodiments. CN signaling (such as Xn or Xx) between the MgNB 105 and SgNB 105 may be used to notify and potentially confirm user inactivity which may trigger the suspension of the RRC connection. In some embodiments, RRC signaling between the MgNB 105 and UE 102 may be used to notify of the SCG configuration.

In some embodiments, one or more techniques (including but not limited to the techniques described herein) may enable resumption, suspension and RAN-initiated paging of UEs 102 that were configured with Dual Connectivity (DC) while they were in an RRC connected mode. In some embodiments, the DC configuration may be suspended or deactivated. In some embodiments, part of the DC configuration (such as DRB configuration associated with the SCG) may be suspended or de-activated and another part of the DC configuration (such as the remaining SCG configuration)

may be released. In some embodiments, CN signaling (such as Xn or Xx) between the MgNB 105 and SgNB 105 may be used to notify when a UE 102 enters and/or exits from an RRC inactive mode. In some embodiments, CN signaling (such as Xn or Xx) between the MgNB 105 and SgNB 105 may be used to notify when new DL data arrives to the SgNB 105 for a UE 102 in an RRC inactive mode. In some embodiments, CN signaling (such as Xn or Xx) between the MgNB 105 and SgNB 105 may be used to notify and potentially confirm of the user inactivity which may trigger the suspension of an RRC connection. In some embodiments, a mechanism to enable data forwarding from an SgNB 105 may be used.

In some embodiments, one or more techniques (including but not limited to the techniques described herein) may enable resumption, suspension and RAN-initiated paging of UEs 102 that were configured with Dual Connectivity (DC) while they were in an RRC connected mode. In some embodiments, the UE 102 in an RRC inactive mode may provide information of the DC configuration (such as to the MgNB 105 and/or other component(s)). In some embodiments, the UE 102 may send one or more measurement reports after resuming an AS security. In some embodiments, some or all of the information provided by the UE 102 during the resumption, such as information included in MSG3 and/or other message(s), to determine if a DC configuration is applicable. In some embodiments, the information provided by the UE 102 may indicate one or more of: that the UE 102 is on a same cell in which the UE AS Context is stored, that the UE 102 is in a same location (as a previous location), that an SCG configuration is still applicable and/or other information. In some embodiments, a resumption procedure may include one or more of: resuming the AS security, providing the reconfiguration information and/or other. In some embodiments, in a resumption procedure, a message (including but not limited to an RRC message 4) may be sent by the RAN node encrypted or unencrypted.

In Example 1, a generation Node-B (gNB) may be configurable to operate as a master gNB (MgNB). An apparatus of the gNB may comprise memory. The apparatus may further comprise processing circuitry. The processing circuitry may be configured to encode radio-resource control (RRC) signaling to provide information for configuring a User Equipment (UE) with a configuration for a secondary cell group (SCG) for dual connectivity to allow the UE to utilize radio resources of both a master cell group (MCG) associated with the MgNB and the SCG, the SCG associated with a secondary gNB (SgNB). The processing circuitry may be further configured to determine, based on inactivity of the UE, a transition of the UE from an RRC connected mode to an RRC inactive mode. The processing circuitry may be further configured to encode, for transmission to the SgNB, an SgNB release request message that indicates a partial suspension of the dual connectivity based on the transition of the UE from the RRC connected mode to the RRC inactive mode. As part of the partial suspension: a first portion of the configuration for the SCG is to be maintained and a second portion of the configuration for the SCG is to be released. The memory may be configured to store the SgNB release request message.

In Example 2, the subject matter of Example 1, wherein the first portion of the configuration may include a signaling radio bearer (SRB) between the SgNB and the UE, and the second portion of the configuration may include a data radio bearer (DRB) between the SgNB and the UE.

In Example 3, the subject matter of one or any combination of Examples 1-2, wherein the first and second portions of the configuration may include one or more parameters related to one or more of: a packet data convergence protocol (PDCP) layer and a service data application protocol (SDAP) layer; or the first and second portions of the configuration may include one or more parameters related to one or more of: a radio link control (RLC) layer and a medium access control (MAC) layer.

In Example 4, the subject matter of one or any combination of Examples 1-3, wherein the processing circuitry may be further configured to determine the inactivity of the UE based on an expiration of an RRC inactivity timer at the MgNB.

In Example 5, the subject matter of one or any combination of Examples 1-4, wherein the processing circuitry may be further configured to decode, from the SgNB, control signaling that indicates the inactivity of the UE.

In Example 6, the subject matter of one or any combination of Examples 1-5, wherein the processing circuitry may be further configured to maintain a configuration for the MCG during the partial suspension of the dual connectivity.

In Example 7, the subject matter of one or any combination of Examples 1-6, wherein the processing circuitry may be further configured to determine that the UE is to be paged based on reception of a downlink data packet from the SgNB, the data packet to be forwarded to the UE. The downlink data packet may be received during the partial suspension of the dual connectivity. The processing circuitry may be further configured to encode, for transmission to the UE, a paging message to page the UE for the downlink data packet.

In Example 8, the subject matter of one or any combination of Examples 1-7, wherein the processing circuitry may be further configured to decode a measurement report received from the UE during a resumption of the dual connectivity. The measurement report may include a signal quality measurement, at the UE, for cells of the SgNB. The processing circuitry may be further configured to determine, based at least partly on the signal quality measurement, whether the dual connectivity is to be resumed with the SgNB.

In Example 9, the subject matter of one or any combination of Examples 1-8, wherein the processing circuitry may be further configured to exchange control signaling with the UE to establish an access stratum (AS) security. The processing circuitry may be further configured to determine whether the dual connectivity is to be resumed with the SgNB based on one or more measurement reports received from the UE, wherein: the measurement reports received from the UE after the AS security is established are used for the determination, and the measurement reports received from the UE before the AS security is established are not used for the determination.

In Example 10, the subject matter of one or any combination of Examples 1-9, wherein the processing circuitry may be further configured to decode a message received from the UE during the partial suspension of the dual connectivity. The message may include information related to connectivity of the UE or location of the UE. The processing circuitry may be further configured to determine, based on the information related to connectivity of the UE or location of the UE, whether the dual connectivity is to be resumed with the SgNB.

In Example 11, the subject matter of one or any combination of Examples 1-10, wherein the information related to connectivity of the UE or location of the UE may include one or more of: whether the UE is in a cell in which a UE context is stored, whether the UE is in a same location as during a previous communication with the MgNB, and whether the SCG for the dual connectivity is valid.

In Example 12, the subject matter of one or any combination of Examples 1-11, wherein the processing circuitry may be further configured to encode, for transmission to the UE, another message that indicates whether the dual connectivity is to be resumed with the SgNB. The other message may be encoded in accordance with the AS security.

In Example 13, the subject matter of one or any combination of Examples 1-12, wherein the apparatus may further include a transceiver to transmit the SgNB release request message.

In Example 14, the subject matter of one or any combination of Examples 1-13, herein the processing circuitry may include a baseband processor to encode the SgNB release request message.

In Example 15, a computer-readable storage medium may store instructions for execution by one or more processors to perform operations for communication by a generation Node-B (gNB). The gNB may be configurable to operate as a master gNB (MgNB). The operations may configure the one or more processors to encode radio-resource control (RRC) signaling to provide configuration information for configuring a User Equipment (UE) with a secondary cell group (SCG) for dual connectivity to allow the UE to utilize radio resources of both a master cell group (MCG) associated with the MgNB and the SCG, the SCG associated with a secondary gNB (SgNB). The operations may further configure the one or more processors to determine, based on inactivity of the UE, a transition of the UE from a radio resource control (RRC) connected mode to an RRC idle mode. The operations may further configure the one or more processors to encode, for transmission to the SgNB, an SgNB release request message that indicates a release of the dual connectivity based on the inactivity of the UE. The operations may further configure the one or more processors to determine that the UE is to be paged based on reception of a downlink data packet from the SgNB to be forwarded to the UE. The downlink data packet may be received after the release of the dual connectivity. The operations may further configure the one or more processors to encode, for transmission to the UE, a paging message to page the UE to indicate transmission, by the MgNB, of the downlink data packet.

In Example 16, the subject matter of Example 15, wherein the operations may further configure the one or more processors to encode the SgNB release request message for transmission to the SgNB on an Xx interface or an Xn interface.

In Example 17, an apparatus of a User Equipment (UE) may comprise memory. The apparatus may further comprise processing circuitry. The processing circuitry may be configured to decode, from a master Generation Node-B (MgNB), first radio-resource control (RRC) signaling that includes information for configuring the UE with a configuration for a secondary cell group (SCG) for dual connectivity to allow the UE to utilize radio resources of both a master cell group (MCG) associated with the MgNB and the SCG, the SCG associated with a secondary gNB (SgNB). The processing circuitry may be further configured to decode, from the MgNB, second RRC signaling that indicates a partial suspension of the dual connectivity. The processing circuitry may be further configured to, as part of the partial suspension of the dual connectivity: maintain a first portion of the configuration for the SCG; and release a second portion of the configuration for the SCG. The memory may be configured to store the signal quality measurement.

In Example 18, the subject matter of Example 17, wherein the processing circuitry may be further configured to, during the suspension of the dual connectivity: monitor for paging messages from the MgNB; and determine a signal quality measurement based on a downlink signal received from the SgNB; and encode, for transmission to the MgNB, a measurement report that indicates the signal quality measurement.

In Example 19, the subject matter of one or any combination of Examples 17-18, wherein the signal quality measurement may be one of: a measured radio frequency (RF) signal quality, a reference signal received power (RSRP), and a reference signal received quality (RSRQ).

In Example 20, the subject matter of one or any combination of Examples 17-19, wherein the processing circuitry may be further configured to encode the measurement report to further indicate whether the signal quality measurement is for the SgNB or for another SgNB.

In Example 21, the subject matter of one or any combination of Examples 17-20, wherein the first and second portions of the configuration may include one or more parameters related to one or more of: a packet data convergence protocol (PDCP) layer and a service data application protocol (SDAP) layer.

In Example 22, the subject matter of one or any combination of Examples 17-21, wherein the first and second portions of the configuration may include one or more parameters related to one or more of: a radio link control (RLC) layer and a medium access control (MAC) layer.

In Example 23, the subject matter of one or any combination of Examples 17-22, wherein the first portion of the configuration may include a signaling radio bearer (SRB) between the SgNB and the UE. The second portion of the configuration may include a data radio bearer (DRB) between the SgNB and the UE.

In Example 24, the subject matter of one or any combination of Examples 17-23, wherein the processing circuitry may be further configured to encode, for transmission to the MgNB during the partial suspension of the dual connectivity, information related to connectivity of the UE or location of the UE.

In Example 25, the subject matter of one or any combination of Examples 17-24, wherein the information related to connectivity of the UE or location of the UE may include one or more of: whether the UE is in a cell in which a UE context is stored, whether the UE is in a same location as during a previous communication with the MgNB, and whether the SCG for the dual connectivity is valid.

In Example 26, the subject matter of one or any combination of Examples 17-25, wherein the processing circuitry may be further configured to decode control signaling from the MgNB for an establishment of an access stratum (AS) security. The processing circuitry may be further configured to encode the measurement report in accordance with the AS security.

In Example 27, the subject matter of one or any combination of Examples 17-26, wherein the UE may be configured with a first medium access control (MAC) entity for the MCG. The UE may be configured with a second MAC entity for the SCG.

In Example 28, a generation Node-B (gNB) may be configurable to operate as a secondary gNB (SgNB). An apparatus of the gNB may comprise memory. The apparatus may further comprise processing circuitry. The processing circuitry may be configured to decode, from a master Generation Node-B (MgNB), control signaling that includes configuration information for configuring a User Equipment (UE) with a secondary cell group (SCG) for dual connectivity to allow the UE to utilize radio resources of both a master cell group (MCG) associated with the MgNB and the SCG, the SCG associated with the SgNB. The processing circuitry may be further configured to decode, from the MgNB, an SgNB release request message that indicates a partial suspension of the dual connectivity, wherein: a data radio bearer (DRB) between the SgNB and the UE is to be released, and a signaling radio bearer (SRB) between the SgNB and the UE is to be maintained. The processing circuitry may be further configured to forward, to the MgNB, a downlink data packet for the UE, the downlink data packet received from a serving gateway (SGW) during the partial suspension of the dual connectivity. The memory may be configured to store information related to the SgNB release request message.

In Example 29, the subject matter of Example 28, wherein the control signaling is first control signaling. The processing circuitry may be further configured to determine, based on a time duration elapsed since a previous uplink communication from the UE, whether the UE is to be put into an inactive mode. The processing circuitry may be further configured to encode, for transmission to the MgNB over an Xx interface or an Xn interface, second control signaling that indicates whether the UE is to be put into an inactive mode.

In Example 30, a generation Node-B (gNB) may be configurable to operate as a master gNB (MgNB). An apparatus of the gNB may comprise means for encoding radio-resource control (RRC) signaling to provide configuration information for configuring a User Equipment (UE) with a secondary cell group (SCG) for dual connectivity to allow the UE to utilize radio resources of both a master cell group (MCG) associated with the MgNB and the SCG, the SCG associated with a secondary gNB (SgNB). The apparatus may further comprise means for determining, based on inactivity of the UE, a transition of the UE from a radio resource control (RRC) connected mode to an RRC idle mode. The apparatus may further comprise means for encoding, for transmission to the SgNB, an SgNB release request message that indicates a release of the dual connectivity based on the inactivity of the UE. The apparatus may further comprise means for determining that the UE is to be paged based on reception of a downlink data packet from the SgNB to be forwarded to the UE. The downlink data packet may be received after the release of the dual connectivity. The apparatus may further comprise means for encoding, for transmission to the UE, a paging message to page the UE to indicate transmission, by the MgNB, of the downlink data packet.

In Example 31, the subject matter of Example 30, wherein the apparatus may further comprise means for encoding the SgNB release request message for transmission to the SgNB on an Xx interface or an Xn interface.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising: at least one processor configured to cause a master node to:
encode radio-resource control (RRC) signaling to provide information for configuring a User Equipment (UE) with a configuration for a secondary cell group (SCG) for dual connectivity to allow the UE to utilize radio resources of both a master cell group (MCG) associated with the master node and the SCG, the SCG associated with a secondary node;
determine, based on inactivity of the UE, a transition of the UE from an RRC connected mode to an RRC inactive mode; and
encode, for transmission to the secondary node, a secondary node request message that indicates suspension of the dual connectivity based on the determination of the transition of the UE from the RRC connected mode to the RRC inactive mode;
decode, from the secondary node, a confirmation of the secondary node request message;
decode, from the secondary node, a message based on data activity for the UE; and
encode, for transmission to the secondary node, a resume message to the secondary node.

2. The apparatus of claim 1, wherein:
a first portion of the configuration includes a signaling radio bearer (SRB) between the secondary node and the UE, and
a second portion of the configuration includes a data radio bearer (DRB) between the secondary node and the UE.

3. The apparatus of claim 1, wherein:
first and second portions of the configuration include one or more parameters related to one or more of: a packet data convergence protocol (PDCP) layer and a service data application protocol (SDAP) layer, or
the first and second portions of the configuration include one or more parameters related to one or more of: a radio link control (RLC) layer and a medium access control (MAC) layer.

4. The apparatus of claim 1, wherein the at least one processor is further configured to cause the master node to:
determine the inactivity of the UE based on an expiration of an RRC inactivity timer at the master node.

5. The apparatus of claim 1, wherein the at least one processor is further configured to cause the master node to:
decode, from the secondary node, control signaling that indicates the inactivity of the UE.

6. The apparatus of claim 1, wherein when the secondary node request message indicates suspension of the dual connectivity:
wherein, as part of the suspension, a first portion of the configuration for the SCG is to be maintained and a second portion of the configuration for the SCG is to be released.

7. The apparatus of claim 1, wherein the at least one processor is further configured to cause the master node to:
determine that the UE is to be paged based on reception of a downlink data packet from the secondary node, the data packet to be forwarded to the UE,
wherein the downlink data packet is received during the suspension or release of the dual connectivity; and
encode, for transmission to the UE, a paging message to page the UE for the downlink data packet.

8. The apparatus of claim 1, wherein the at least one processor is further configured to cause the master node to:
decode a measurement report received from the UE during a resumption of the dual connectivity,
wherein the measurement report includes a signal quality measurement, at the UE, for cells of the secondary node;

determine, based at least partly on the signal quality measurement, whether the dual connectivity is to be resumed with the secondary node.

9. The apparatus of claim 1, wherein the at least one processor is further configured to cause the master node to:
exchange control signaling with the UE to establish an access stratum (AS) security;
determine whether the dual connectivity is to be resumed with the secondary node based on one or more measurement reports received from the UE, wherein: the measurement reports received from the UE after the AS security is established are used for the determination, and
the measurement reports received from the UE before the AS security is established are not used for the determination.

10. The apparatus of claim 1, wherein the at least one processor is further configured to cause the master node to:
decode a message received from the UE during the suspension or release of the dual connectivity, wherein the message includes information related to connectivity of the UE or location of the UE; and
determine, based on the information related to connectivity of the UE or location of the UE, whether the dual connectivity is to be resumed with the secondary node.

11. The apparatus of claim 10, wherein the information related to connectivity of the UE or location of the UE includes one or more of:
whether the UE is in a cell in which a UE context is stored,
whether the UE is in a same location as during a previous communication with the master node, and
whether the SCG for the dual connectivity is valid.

12. The apparatus of claim 10, wherein the at least one processor is further configured to cause the master node to:
encode, for transmission to the UE, another message that indicates whether the dual connectivity is to be resumed with the secondary node,
wherein the other message is encoded in accordance with an access stratum (AS) security.

13. A network node, comprising:
at least one processor configured to cause the network node, operating as a master node, to:
encode radio-resource control (RRC) signaling to provide information for configuring a User Equipment (UE) with a dual connectivity (DC) configuration for a secondary cell group (SCG) for dual connectivity to allow the UE to utilize radio resources of both a master cell group (MCG) associated with the master node and the SCG, the SCG associated with a secondary node;
determine, based on inactivity of the UE, a transition of the UE from an RRC connected mode to an RRC inactive mode; and
encode, for transmission to the secondary node, a secondary node request message that indicates release of the DC configuration based on the determination of the transition of the UE from the RRC connected mode to the RRC inactive mode, wherein release of the DC configuration includes keeping part of the DC configuration and releasing another part of the DC configuration;
decode, from the secondary node, a confirmation of the secondary node request message;
decode, from the secondary node, a message based on data activity for the UE; and
encode, for transmission to the secondary node, a resumption message to the secondary node.

14. The network node of claim 13, wherein the at least one processor is further configured to cause the master node to:
determine the inactivity of the UE based on an expiration of an RRC inactivity timer at the master node.

15. The network node of claim 13, wherein the at least one processor is further configured to cause the master node to:
decode, from the secondary node, control signaling that indicates the inactivity of the UE.

16. The network node of claim 13, wherein when the secondary node request message indicates suspension of the dual connectivity:
wherein, as part of the suspension, a first portion of the configuration for the SCG is to be maintained and a second portion of the configuration for the SCG is to be released.

17. A network node, comprising:
at least one processor configured to cause the network node, operating as a secondary node associated with a secondary cell group (SCG), to:
decode, from a master node associated with a master cell group (MCG), a secondary node request message that indicates suspension of a dual connectivity (DC) of a user equipment (UE);
determine, based on inactivity of the UE, a transition of the UE from a radio resource control (RRC) connected mode to an RRC inactive mode, wherein:
the suspension of the DC is based on the determination, and
the UE is configured via RRC signaling providing information for a configuration for the SCG, for DC to allow the UE to utilize radio resources of both the MCG and the SCG;
encode, for transmission to the master node, a confirmation of the secondary node request message;
encode, for transmission to the master node, a message based on data activity for the UE; and
decode, from the master node, a resume message.

18. The network node of claim 17, wherein:
the inactivity of the UE is further based on an expiration of an RRC inactivity timer at the master node.

19. The network node of claim 17, wherein the at least one processor is further configured to cause the secondary node to:
encode, for transmission to the master node, control signaling that indicates the inactivity of the UE.

20. The network node of claim 17, wherein when the secondary node request message indicates suspension of the dual connectivity:
wherein, as part of the suspension, a first portion of the configuration for the SCG is to be maintained and a second portion of the configuration for the SCG is to be released.

* * * * *